(12) United States Patent
Hao et al.

(10) Patent No.: US 8,195,130 B2
(45) Date of Patent: Jun. 5, 2012

(54) VISUAL VOICEMAIL NETWORK ARCHITECTURE

(75) Inventors: Jack Jianxiu Hao, Lexington, MA (US); Dahai Ren, Waltham, MA (US); Shuai Wu, Waltham, MA (US); Robert C. Baruch, Rising Sun, MD (US); Christopher L. Helbling, Norwalk, CT (US); Gerald Y. Honma, Aiea, HI (US); Xuefeng Yao, Waban, MA (US); Haiyan Zhou, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 738 days.

(21) Appl. No.: 12/334,469

(22) Filed: Dec. 14, 2008

(65) Prior Publication Data
US 2010/0151831 A1    Jun. 17, 2010

(51) Int. Cl.
*H04M 1/725* (2006.01)
(52) U.S. Cl. .................. 455/412.1; 455/412.2; 455/413; 455/445; 455/453

(58) Field of Classification Search ............... 455/412.1, 455/412.2, 413, 445, 453
See application file for complete search history.

(56) References Cited

U.S. PATENT DOCUMENTS
2009/0191848 A1 *   7/2009   Helferich ................... 455/412.1
* cited by examiner Primary Examiner — Nghi Ly

(57) ABSTRACT

A system may include a load balancer that includes a receiver configured to receive a first notification of voicemail message information associated with a voicemail mailbox. The system may also include a group of servers and each of the group of servers may include a receiver and a transmitter. The receiver may be configured to receive the first notification of the voicemail message information from the load balancer, and the transmitter may be configured to send a second notification of the voicemail message information to a communication device associated with the voicemail mailbox, wherein the second notification causes the communication device to determine whether to request a list of voicemail messages. The load balancer may also include a processor to select a first one of the plurality of servers and a transmitter to send the first notification to the first one of the plurality of servers.

22 Claims, 25 Drawing Sheets

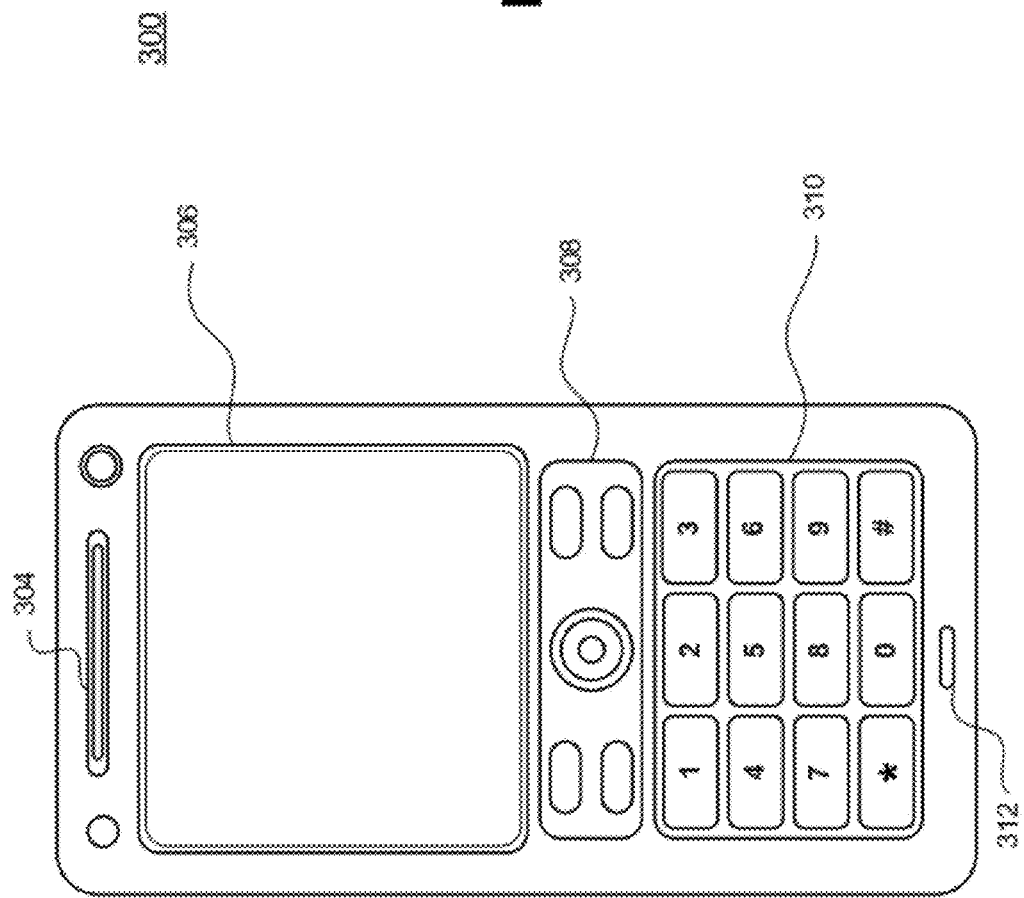

| MESSAGE TABLE 600-1 | | | | | |
|---|---|---|---|---|---|
| MAILBOX ID 602 | MESSAGE ID 604 | CALLED DN 605 | CALLER DN 606 | STATE 610 | LOCATION 612 |
| MBA1 | A124 | 7035678909 | 2025361234 | HEARD | MSG9.QCP |

| MESSAGE TABLE 600-2 | | | | | |
|---|---|---|---|---|---|
| MAILBOX ID 602 | MESSAGE ID 604 | CALLED DN 605 | CALLER DN 606 | STATE 610 | LOCATION 612 |
| MBB1 | B156 | 2023459292 | 9186321642 | SAVED | MSG2.QCP |

| MESSAGE TABLE 600-3 | | | | | |
|---|---|---|---|---|---|
| MAILBOX ID 602 | MESSAGE ID 604 | CALLED DN 605 | CALLER DN 606 | STATE 610 | LOCATION 612 |
| MBC1 | C129 | 2022513434 | 2018675309 | HEARD | MSG1.QCP |

FIG. 6A

MESSAGE TABLE 600-1'

| MAILBOX ID 602 | MESSAGE ID 604 | CALLED DN 605 | CALLER DN 606 | STATE 610 | LOCATION 612 |
|---|---|---|---|---|---|
| MBA1 | A124 | 7035678989 | 2025361224 | HEARD | MSG8.OCP |
| MBA1 | A125 | 7035678989 | 2039574998 | NEW | MSG9.OCP |

MESSAGE TABLE 600-2'

| MAILBOX ID 602 | MESSAGE ID 604 | CALLED DN 605 | CALLER DN 606 | STATE 610 | LOCATION 612 |
|---|---|---|---|---|---|
| MBB1 | B156 | 2023459292 | 9186321642 | SAVED | MSG2.OCP |
| MBB1 | B157 | 2023459292 | 3016851233 | NEW | MSG3.OCP |

MESSAGE TABLE 600-3'

| MAILBOX ID 602 | MESSAGE ID 604 | CALLED DN 605 | CALLER DN 606 | STATE 610 | LOCATION 612 |
|---|---|---|---|---|---|
| MBC1 | C129 | 2022513434 | 2018675309 | HEARD | MSG1.OCP |
| MBC1 | C130 | 2022513434 | 4569812124 | NEW | MSG4.OCP |

FIG. 6B

AGGREGATE MESSAGE TABLE 700

| MAILBOX ID 702 | MESSAGE ID 704 | CALLED DN 705 | CALLER DN 706 | STATE 710 | LOCATION 712 |
|---|---|---|---|---|---|
| MBA1 | A124 | 7035678989 | 2025361234 | HEARD | MSG8.OCP |
| MBC1 | C129 | 2022513434 | 2018675309 | HEARD | MSG1.OCP |
| MBB1 | B156 | 2023459292 | 9186321642 | SAVED | MSG2.OCP |

AGGREGATE MESSAGE TABLE 700'

| MAILBOX ID 702 | MESSAGE ID 704 | CALLED NO. 705 | CALLER NO. 706 | STATE 710 | LOCATION 712 |
|---|---|---|---|---|---|
| MBA1 | A124 | 7035678989 | 2025361234 | HEARD | MSG8.QCP |
| MBC1 | C129 | 2022513434 | 2018675309 | HEARD | MSG1.QCP |
| MBB1 | B156 | 2023459292 | 9186321642 | SAVED | MSG2.QCP |
| MBB1 | B157 | 2023459292 | 3016651233 | NEW | MSG3.QCP |
| MBC1 | C130 | 2022513434 | 4569812124 | NEW | MSG4.QCP |
| MBA1 | A125 | 7035678989 | 2039574986 | NEW | MSG9.QCP |

(rows labeled 752, 754, 756, 758, 760, 762)

VVM TABLE 800

HEADER TABLE 800-2

| DN 852 | 2022513434 |
| PRIMARY KEY 854 | ASDF |
| NOTIFICATION TIME 856 | 1301 |
| HEADER CACHE 858 | [RECORD 754] [RECORD 760] |

DEVICE TABLE 800-1

| DN 802 | 2022513434 |
| PRIMARY KEY 803 | ASDF |
| PIN 804 | 1234 |
| SESSION COOKIE 806 | QWER |
| COOKIE TIMER 808 | 1300 |
| MBID 810 | MBC1 |
| NOTIFICATION 811 | 2022513434, 2022345929Z, 7035678989 |
| NAME 812 | JOHN SMITH |
| SRC 814 | ABC |
| VERSION 816 | 2006.12 |
| DEVICE MODEL 818 | LG9600 |
| TEXT ENABLE 820 | Y |
| COMMENT 822 | ACCOUNT CURRENT |
| LAST MODIFIED 824 | 2008.12.3.1200 |

900A

900B

900C

900D

900E

900F

1100A

1100B

1300

1300

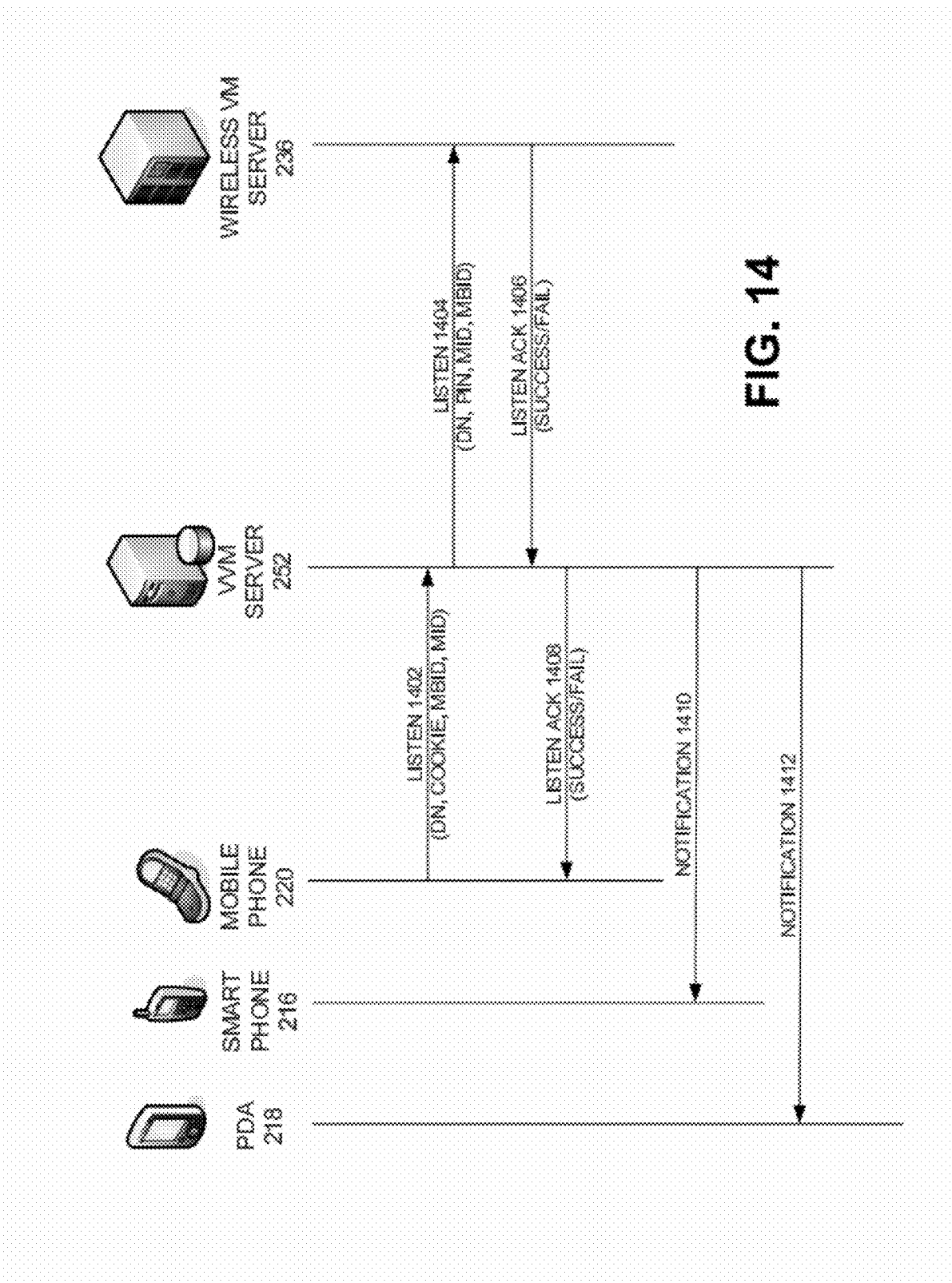

VISUAL VOICEMAIL NETWORK ARCHITECTURE

BACKGROUND INFORMATION

Visual voicemail is a user friendly application that adds a visual aspect to managing voicemail messages. Visual voicemail may enable mobile phone users to manage voicemail message in an order of their choice, e.g., in a random order rather than a sequential order.

BRIEF DESCRIPTION OF THE DRAWINGS

FIG. 3 is a block diagram of an exemplary user device;

FIGS. 6A and 6B are diagrams of exemplary message tables;

FIGS. 7A and 7B are block diagrams of exemplary aggregate message tables;

FIG. 8 is a block diagram of an exemplary visual voicemail table;

FIG. 14 is a diagram of exemplary network signals for listening to a voicemail message.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1A:
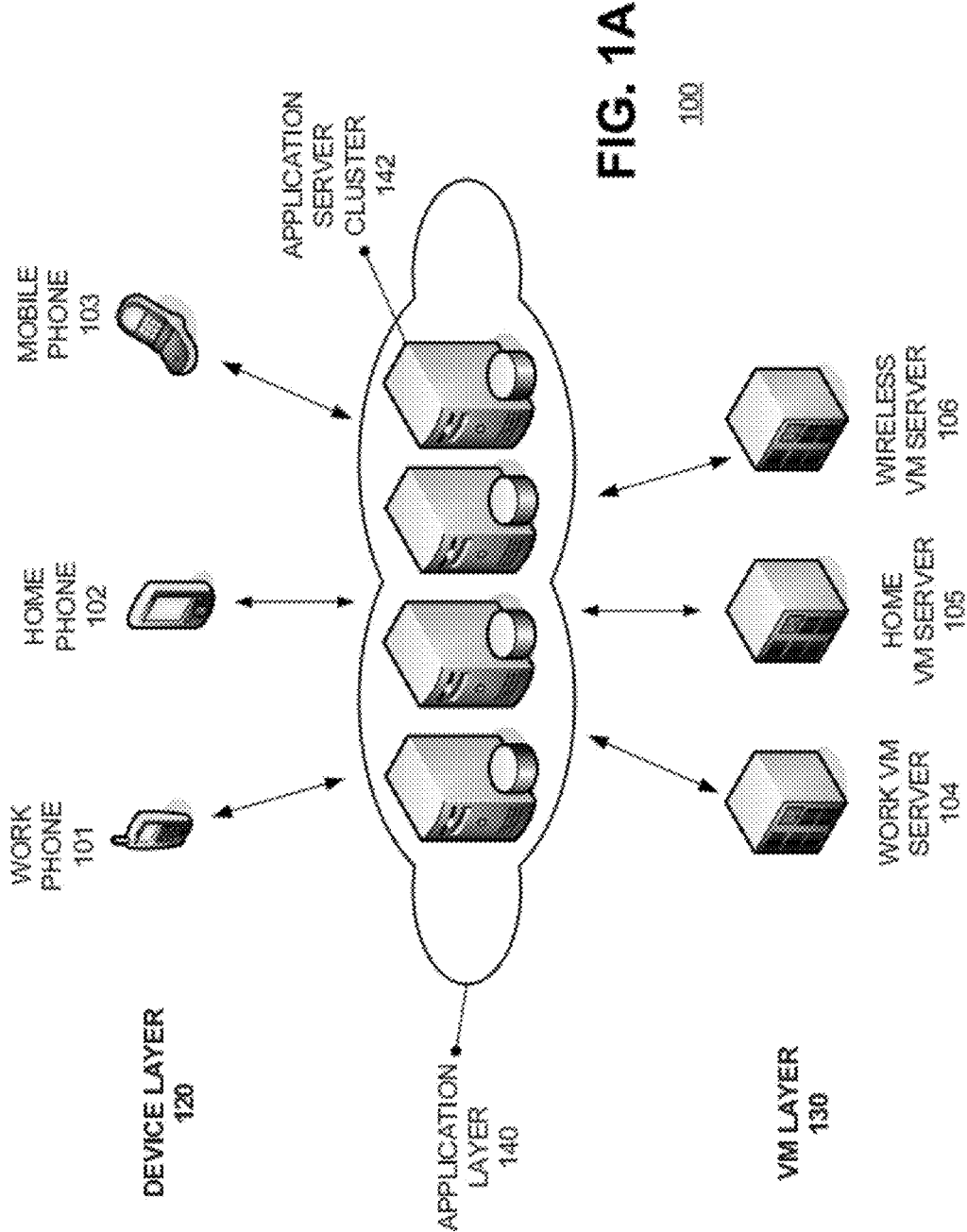
FIG. 1A is a block diagram of an exemplary environment in which embodiments disclosed herein may be implemented.

FIG. 1A is a block diagram of an exemplary environment 100 in which embodiments disclosed herein may be implemented. Environment 100 may include a device layer 120, a voicemail layer, and an application layer 140. Device layer may include a work phone 101, a home phone 102, and a mobile phone 103. VM layer 130 may include a work voicemail (VM) server 104, a home VM server 105, and a wireless VM server 106. Application layer 140 may include a cluster of application servers 142.

Figure 1D:
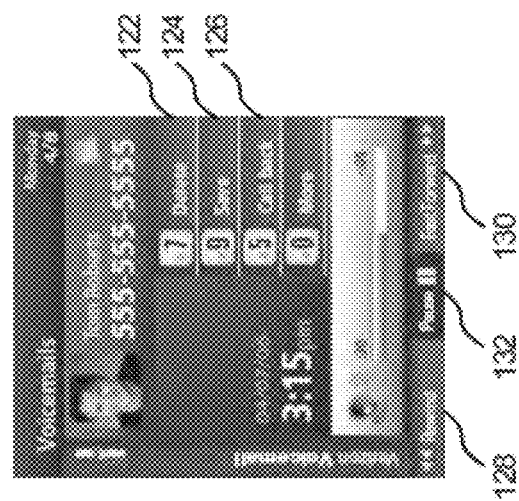
FIGS. 1B, 1C, and 1D show exemplary visual voicemail graphical user interfaces.
Figure 1C:
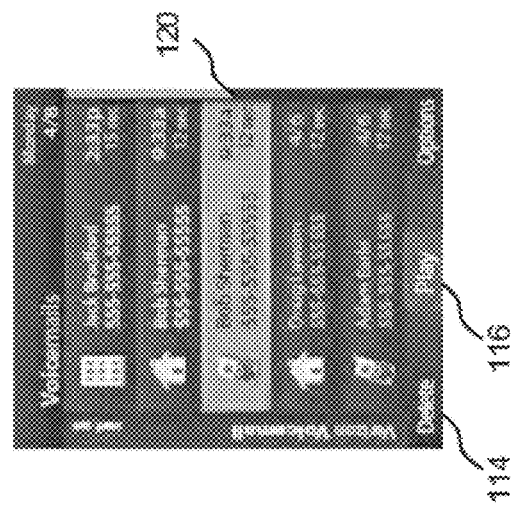
Figure 1B:
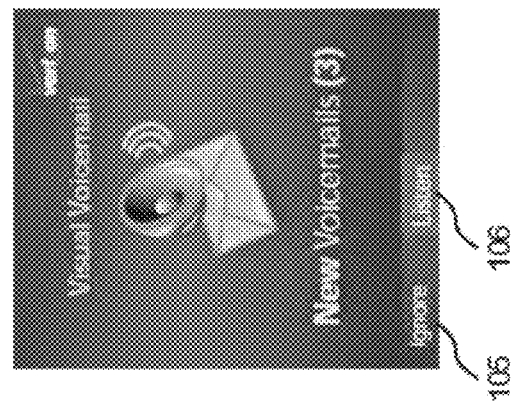

FIGS. 1B, 1C, and 1D show exemplary visual voicemail (VVM) graphical user interfaces (GUIs) for a communication device, such a portable communication device (e.g., a mobile phone). FIG. 1B shows an exemplary pop-up screen for notifying a user that there are three new voicemail messages waiting in the user's voicemail box. FIG. 1B also shows that the user may select to ignore the voicemail messages (e.g., by selecting option 105) or listen to the voicemail messages (e.g., by selecting option 106). If the user selects to listen to the voicemail messages, the user may be presented with the GUI shown in FIG. 1C, for example.

FIG. 1C shows an exemplary list of voicemail messages including, for each voicemail, the name of the caller, the phone number of the caller, the time of the call, and the length of the voicemail message. The exemplary GUIs of the communication device may allow a user to manage the selected voicemail message. In the exemplary GUI of FIG. 1C, the user may scroll to and select any of the listed voicemail messages in any order. For example, a voicemail message 120 (in the user's mobile-phone mailbox) from Bob Sherman is highlighted for selection. The user may delete the selected voicemail message (e.g., by selecting option 114) or play the selected voicemail message (e.g., by selecting option 116). If the user selects to play the voicemail, the user may be presented with the GUI shown in FIG. 1D, for example.

FIG. 1D shows an exemplary voicemail message being played. As shown in FIG. 1D, the user may delete the selected message (e.g., by selecting option 122 or a key labeled "7" on a numeric keypad); may save the message (e.g., by selecting option 124 or a key labeled "9" on the numeric keypad); may initiate a call to the party that left the voicemail message (e.g., by selecting option 126 or a key labeled "5" on the numeric keypad); may rewind the message (e.g., by selecting option 128); may fast-forward the message (e.g., by selecting option 130); or may pause the message (e.g., by selecting option 132). In one embodiment, management actions taken on a message using one communication device may be reflected on one or more other communication devices that may manage the same mailbox.

Figure 2A:
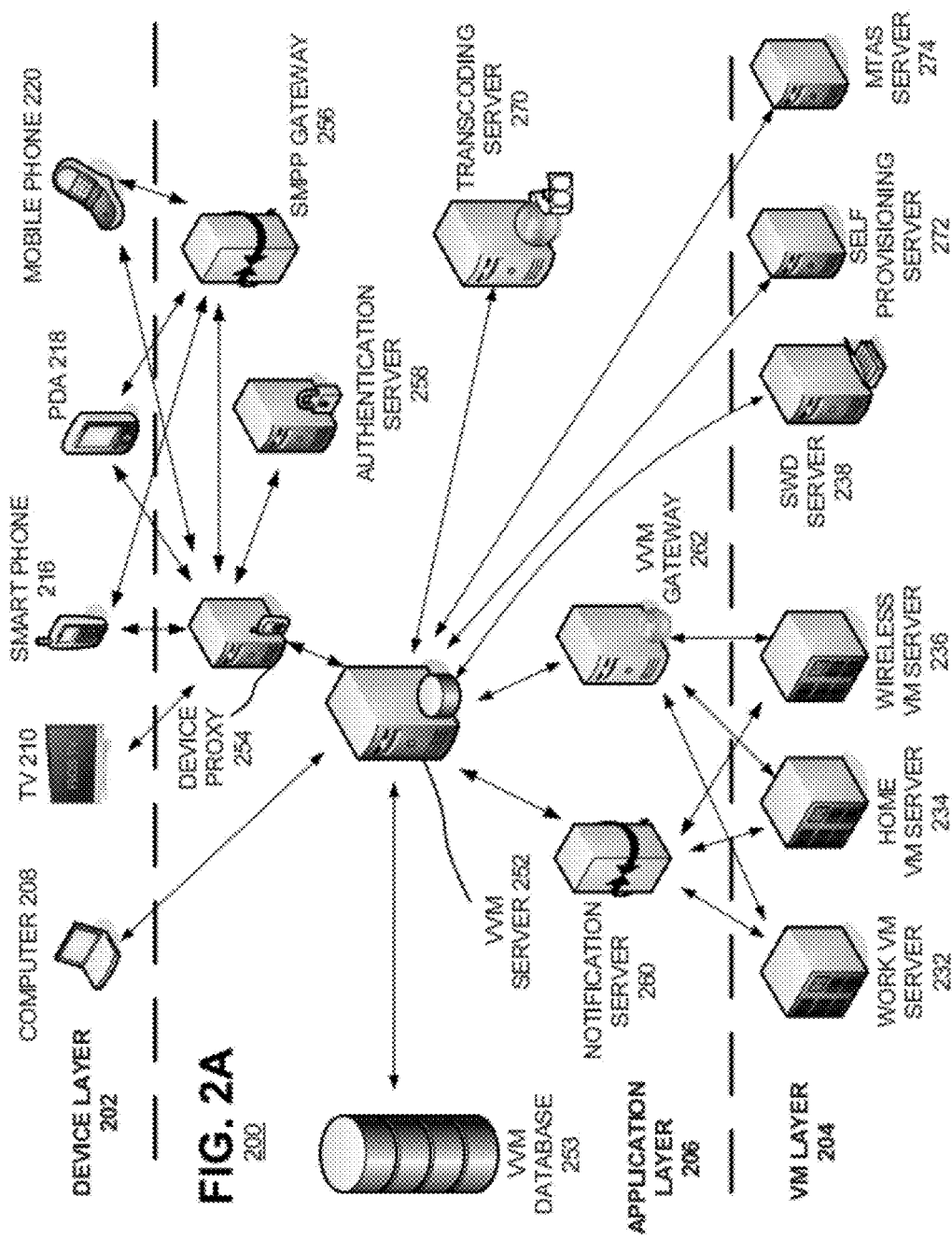
FIG. 2A is a block diagram of an exemplary network in which embodiments described herein may be implemented.

FIG. 2A shows an exemplary network 200 in which embodiments described herein may be implemented. As shown, network 200 may include a device layer 202, a voicemail (VM) layer 204, and an application layer 206. Application layer 206 may lie between device layer 202 and VM layer 204 and may facilitate the exchange of messages (e.g., communications) between device layer 202 and VM layer 204.

Device layer 202 may include, for example, a computer 208, a television (TV) 210, a smart phone 216 (e.g., a Blackberry™, Treo™, etc.), a PDA 218, a mobile phone 220, and/or another type of communication device. Any of devices 208-220 may be considered user devices. VM layer 204 may include VM servers 232-236 (e.g., a work VM server 232, a home VM server 234, and a wireless VM server 236), a service-wide directory (SWD) server 238, a self provisioning server 272, and a Mobile Telephone Activation System provisioning server 274 (MTAS server 274). Application layer 206 may include a VVM server 252, a VVM database 253, a device proxy 254, an SMPP (Short Message Peer-to-Peer Protocol) gateway server 256, an authentication server 258, a notification server 260, a VVM gateway server 262, and a transcoding server 270.

Computer 208 may include one or more computer systems for hosting programs, databases, and/or applications. Computer 208 may include a laptop, desktop, or any other type of computing device. Computer 208 may include a browser application program for navigating a network, such as the Internet.

TV 210 may include a device capable of receiving and reproducing video and audio signals, e.g., a video display device. TV 210 may include a liquid crystal display (LCD), a cathode ray tube (CRT), a plasma display, etc.

TV 210 may be associated with a set-top box (STB) (not shown). The STB may include a computer device, such as a cable card, for hosting programs, databases, and/or applications. In one embodiment, TV 210 may include the STB in the same housing. TV 210 and/or the STB may include a visual voicemail application to receive, listen to, and/or send voicemail messages. TV 210 and/or the STB may be associated with a remote control (not shown). The remote control may include control keys to navigate menus displayed on TV 210, for example, and to otherwise control functions of TV 210 and/or the STB. The remote control may transmit infrared signals, or another type of signals, to an input device associated with the STB and/or TV 210.

Smart phone 216, PDA 218, and/or mobile phone 220 may allow a user to place telephone calls to other user devices. Smart phone 216, PDA 218, and/or mobile phone 220 may communicate with other devices via one or more communication towers (not shown) using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), etc. In one embodiment, smart phone 216, mobile phone 220, and/or PDA 218 may communicate with other devices through a wireless local network using WiFi (e.g., IEEE 802.11x).

In other embodiments, smart phone 216, PDA 218, and/or mobile phone 220 may also communicate with other devices via a wired network. For example, smart phone 216, mobile phone 220, and PDA 218 may communicate with other devices using a public-switched telephone network (PSTN) or the Ethernet protocol. Smart phone 216, PDA 218, and mobile phone 220 may include a visual voicemail application to receive, listen to, and/or send voicemail messages.

Work VM server 232, home VM server 234, and wireless VM server 236 may each receive and store voicemail messages in mailboxes associated with one or more user devices, such as user devices 208-220. Examples of VM servers include the Lucent Automatic Call Distributor (ACD) server and the Comverse Voicemail Service Node (VSN) server. VM servers 232-236 may receive voicemail messages when, for example, a user does not answer a call request. VM servers 232-236 may deliver the voicemail messages when requested, for example, to one of user devices 208-220 or VVM server 252. In one embodiment, VM servers 232-236 may store video voicemail, as well as audio voicemail. In one embodiment, VVM server may aggregate voicemail information from work VM server 232, home VM server 234, and/or wireless VM server 236.

In one exemplary embodiment, user devices 208-220 may be associated with a single user. For example, a user may have been issued smart phone 216 and computer 208 (which may include a soft phone) by an employer to be used for work. The same user may own mobile phone 220 for personal use and may have TV 210 at home for family use. The same user may also own PDA 218 that may be used as a personal address book as well as a home phone. In this exemplary embodiment, work VM server 232 may receive and store voicemail for smart phone 216; home VM server 234 may receive and store voicemail for PDA 218; and wireless VM server 236 may receive and store voicemail for mobile phone 220. Although user devices 208-220 may be associated with one user in this example, VM servers 232-236 may store voicemails for more than one user (e.g., thousands or hundreds of thousands of users).

VM servers 232-236 may notify VVM server 252 of new voicemail messages by sending messages (e.g., SMPP messages) to VVM server 252 through notification server 260. VM servers 232-236 may also provide voicemail message information (e.g., voicemail message headers) to VVM server 252 by sending messages (e.g., IMAP (Internet Message Mapping Protocol) messages) to VVM server 252 through VVM gateway 262. VM servers 232-236 may also send voicemail message audio files to devices 208-220 through VVM gateway 262, VVM server 252 and/or device proxy 254, for example.

SWD server 238 may include a database of device numbers (e.g., phone numbers, mobile device numbers, Universal Resource Indicators (URIs), or Universal Resource Locaters (URLs)) and corresponding mailbox identifiers (mailbox IDs) associated with each of the device numbers. A mailbox ID may identify the mailbox used for storing voicemail messages for a corresponding device number. A mailbox ID may also identify the VM server (e.g., one of VM servers 232-236) with which the mailbox is associated. SWD 238 may also store information for associating multiple user devices, device numbers, or mailbox IDs with a single user, such as associating user devices 208-220 with the same user.

VVM server 252 may include one or more computer systems for hosting programs, databases, and/or applications. VVM server 252 may run a web server application, such as Apache, to serve web pages when requested. VVM server 252 may allow a user to access voicemail message over the a data network, for example, using computer 208. VVM server 252 may run a visual voicemail application. VVM application may request voicemail messages and/or headers from one of VM servers 232-236 and may forward voicemail messages and/or headers to any one of devices 208-220 directly or through VVM gateway 262, device proxy 254, and/or SMPP gateway 256.

VVM database 253 may include one or more computer systems for hosting programs, databases, and/or applications. VVM database 253 may store information related to the applications running in VVM server 252, for example. VVM database may store voicemail messages and/or headers received from VM servers 232-236 or information received from devices 208-220, for example.

Notification server 260 may receive voicemail message notifications (e.g., SMPP messages) from VM servers 232-236. Notification server 260 may pass notifications of voicemail messages received from VM servers 232-236 to VVM server 252 (e.g., as HTTP messages). Notification server 260 may include one or more computer systems for hosting programs, databases, and/or applications.

VVM gateway 262 may receive information about voicemail messages (e.g., voicemail message headers) from VM servers 232-236. The information may include lists of voicemail messages that may include data conforming to, for example, the IMAP protocol. VVM gateway 262 may pass voicemail message headers received from VM servers 232-236 to VVM server 252. VVM gateway 262 may pass data to VVM server 252 in the form of XML (eXtensible Markup Language) data in HTTP messages, for example. VVM gateway 262 may include one or more computer systems for hosting programs, databases, and/or applications.

Device proxy 254 may receive communications from one or more user devices 210-220 for forwarding to other devices (e.g., VVM server 252 and/or SMPP gateway 256). Device proxy 254 may also authenticate user devices (e.g., user devices 210-220) by, for example, communicating with authentication server 258. Authentication server 258 may store information related to device authentication, such as session cookies. Device proxy 254 may communicate with devices (e.g., user devices 210-220) using secure channels implementing, for example, SSL (Secure Socket Layer) protocols or TLS (Transport Layer Security) protocols.

SMPP gateway 256 may receive SMPP (e.g., SMS (Short Message System)) messages from device proxy 254 and pass the received SMPP messages to user devices, such as user devices 216-220. SMPP gateway 256 may also receive SMPP messages from user devices 216-220, for example, and pass the received SMPP messages to device proxy 254.

Transcoding server 270 may include one or more computer systems for hosting programs, databases, and/or applications. Transcoding server 270 may convert an audio, video, or graphic file from one format to another (e.g., from one bit rate to another bit rate, from one resolution to another, from one standard to another, from one file size to another, etc.). Transcoding server 270 may allow different audio, video, and/or graphic files to be displayed or played on any device in network 200. Examples of audio formats include MP3, WMA (Windows Media Audio), AAC (Advanced Audio Coding), QCP (Qualcomm Code Prediction), QCEP (Qualcomm Code Excited Linear Prediction), EVRC (Enhanced Variable Rate Codec), AMR (Adaptive Multi-Rate), Ogg Vorbis, etc. Transcoding server 270 may convert an audio file from any of these formats into any other one of these formats, for example, or into the same format but at a different rate, resolution, size, etc.

Self provisioning server 272 and MTAS server 274 may include one or more computer systems for hosting programs, databases, and/or applications. Self provisioning server 272 and MTAS server 274 may store a database of information associating user names, device numbers, subscribed services and features, account commentary, account numbers, etc.

In other embodiments, network 200 may include more, fewer, or different devices. For example, network 200 may include a voice-to-text (V2T) server and a V2T engine server. Moreover, one or more devices 208-274 may perform one or more functions of any other device in network 200. Furthermore, one or more of devices 208-274 may be remotely located from each other, e.g., devices 208-274 may be geographically diverse. Although FIG. 2A shows devices 208-274 coupled to each other in a particular configuration, devices 208-274 may also be arranged in other configurations, either coupling directly with each other or through one or more networks, such that any one of devices 208-274 may communicate with any other one of devices 208-274. For example, any one of devices 208-274 may communicate with any other one of devices 208-274 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

Figure 2B:
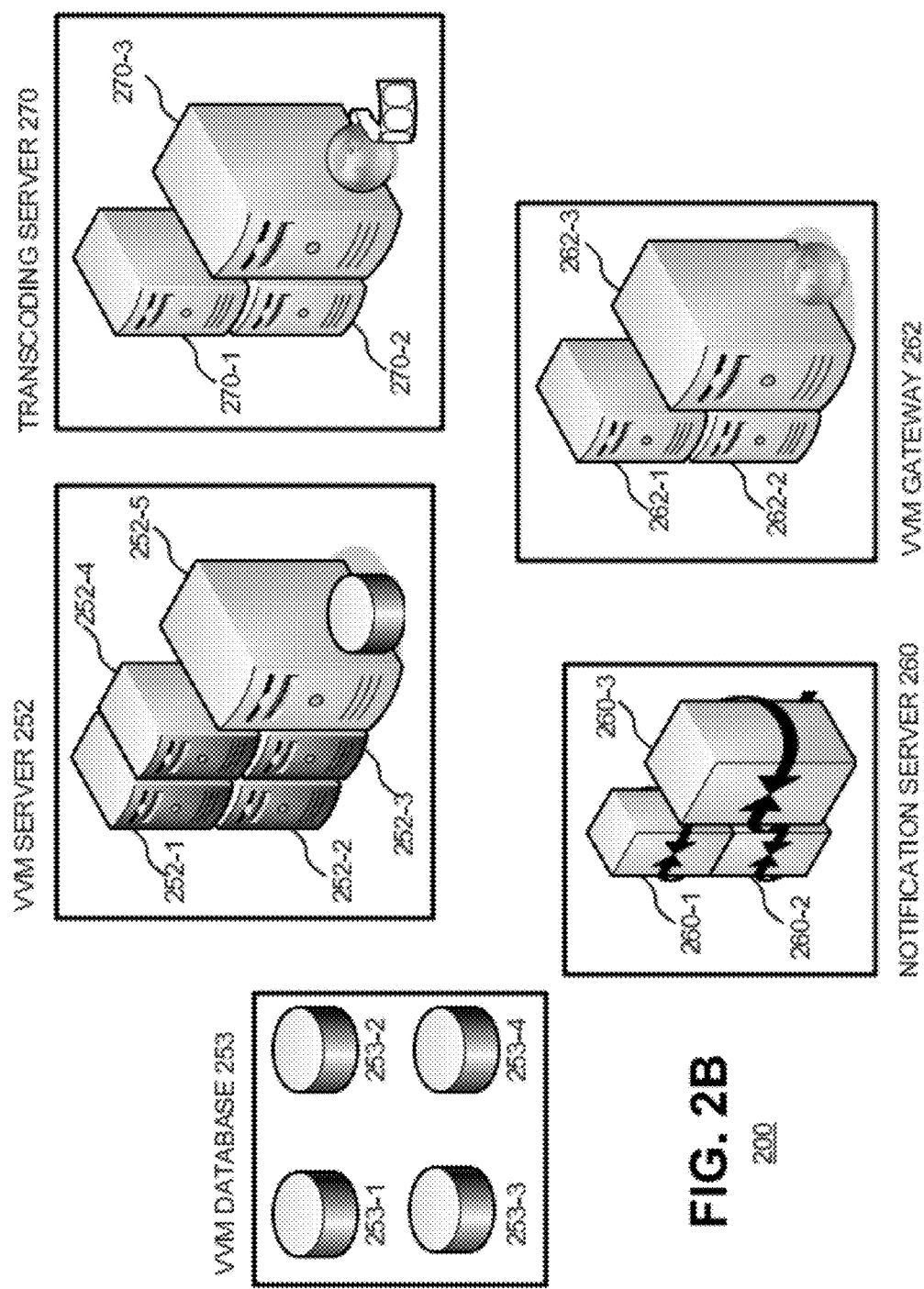
FIG. 2B is a block diagram of exemplary clusters of servers for use with the components of FIG. 1.

As discussed above, VVM server 252, VVM database 253, transcoding server 270, notification server 260, and VVM gateway 262 may include one or more computer systems such as, for example, a cluster of servers. FIG. 2B is a block diagram of exemplary clusters of servers associated with VVM server 252, VVM database 253, transcoding server 270, notification server 260, and VVM gateway 262. As shown in FIG. 2B, VVM server 252 may include VVM server 252-1 through 252-5; VVM database may include VVM database 253 through VVM database 253-4; transcoding server 270 may include transcoding server 270 through 270-3; notification server 260 may include notification server 260-1 through 260-3; and VVM gateway server 262-1 through 262-3. Each cluster may include more servers, e.g., the number of servers shown is for example only. Each server in a cluster may perform the same function as other servers in the cluster, for example.

A cluster of servers may provide for scalability, load balancing, and reliability. Regarding scalability, as the number of users that subscribe to the services provided by VVM server 252 increases, for example, the extra load may be borne by adding another VVM server 252-$x$ rather than replacing existing servers. Regarding load balancing, as requests for services are received, for example, these requests may be distributed across the different servers in the cluster. For load balancing, a cluster may include a router (not shown in FIG. 2B) for sending requests, for example, to the different servers. Regarding reliability, for example, if one of the servers in the cluster should fail, for example, the remaining servers in the cluster may provide uninterrupted (or near uninterrupted) services provided for by the cluster.

In FIG. 2B, VVM database 253 may be a distributed and shared database used by VVM server 252. In one embodiment, each of VVM server 252, VVM database 253, transcoding server 270, notification server 260, and/or VVM gateway server 262 may include a cluster of two, five, nine, twenty, or more servers.

Figure 2C:
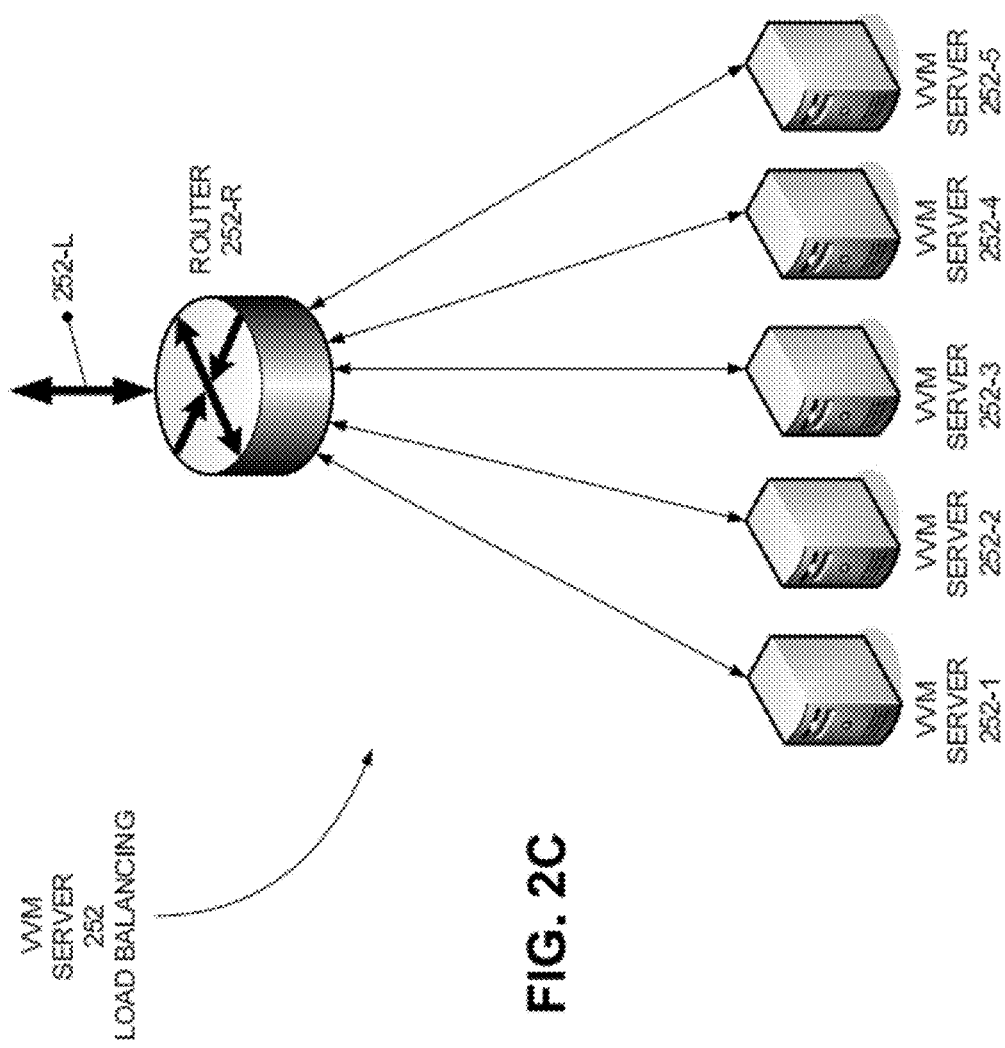
FIG. 2C is a block diagram of an exemplary load balancer for the visual voicemail server of FIG. 1.

FIG. 2C is a block diagram of VVM server 252 including a router 252-R for load balancing, for example. Router 252-R (e.g., a load balancer) may receive data on a link 252-L and may forward the received data to one or more of VVM servers 252-1 through 252-5. Router 252-R may also receive data from one or more of VVM servers 252-1 through 252-5 and forward the received data to its destination, such as any of the devices in network 200. For example, VVM server 252 may receive a request from a user device for a service and router 252-R may send the request to one of VVM servers 252-1 through 252-5. Router 252-R may send the received requests in a round-robin fashion or based on the current load and/or processing power of the servers 252-1 through 252-5. Router 252-R may be used for purposes other than load balancing, such as for routing regardless of load balancing.

Although not depicted, the load balancing for transcoding server 270, VVM gateway 262, notification server 260 and database 253 may be similar. For example, VVM database 253 may include a router 253-R (not shown) for routing requests to VVM databases 253-1 through 253-4. VVM gateway 262 may include a router 262-R (not shown) for routing requests to VVM gateway 262-1 through 262-3. Notification server 260 may include a router 260-R (not shown) for routing requests to Notification server 260-1 through 253-3. Transcoding server 270 may include a router 270-R (not shown) for routing requests to transcoding servers 270-1 through 270-3.

Although VVM server 252, VVM database 253, transcoding server 270, notification server 260, and VVM gateway server 262 were chosen in this embodiment (e.g., FIGS. 2B and 2C) for explicitly showing clusters of servers, any server in network 200 may be similarly configured.

FIG. 3 is diagram of an exemplary user device 300, such as one or more of user devices 208-220. As illustrated, user device 300 may include a speaker 304, a display 306, control keys 308, a keypad 310, and a microphone 312. User device 300 may include other components (not shown in FIG. 3) that aid in receiving, transmitting, and/or processing data. Moreover, other configurations of user device 300 are possible.

Speaker 304 may provide audible information to a user of user device 300. Display 306 may include a display screen to provide visual information to the user, such as video images or pictures, and may include a touch-screen display to accept inputs from the user. For example, display 306 may provide information regarding incoming or outgoing telephone calls, telephone numbers, contact information, current time, voicemail, email, etc. Display 306 may display the GUIs shown in FIGS. 1B-1D, for example.

Control keys 308 may permit the user to interact with user device 300 to cause user device 300 to perform one or more operations, such as interacting with a visual voicemail application. Control keys 308 may include soft keys that may perform the functions indicated on display 306 directly above the keys. Keypad 310 may include a standard telephone keypad and may include additional keys to enable inputting (e.g., typing) information into user device 300. Microphone 312 may receive audible information from the user.

Figure 4:
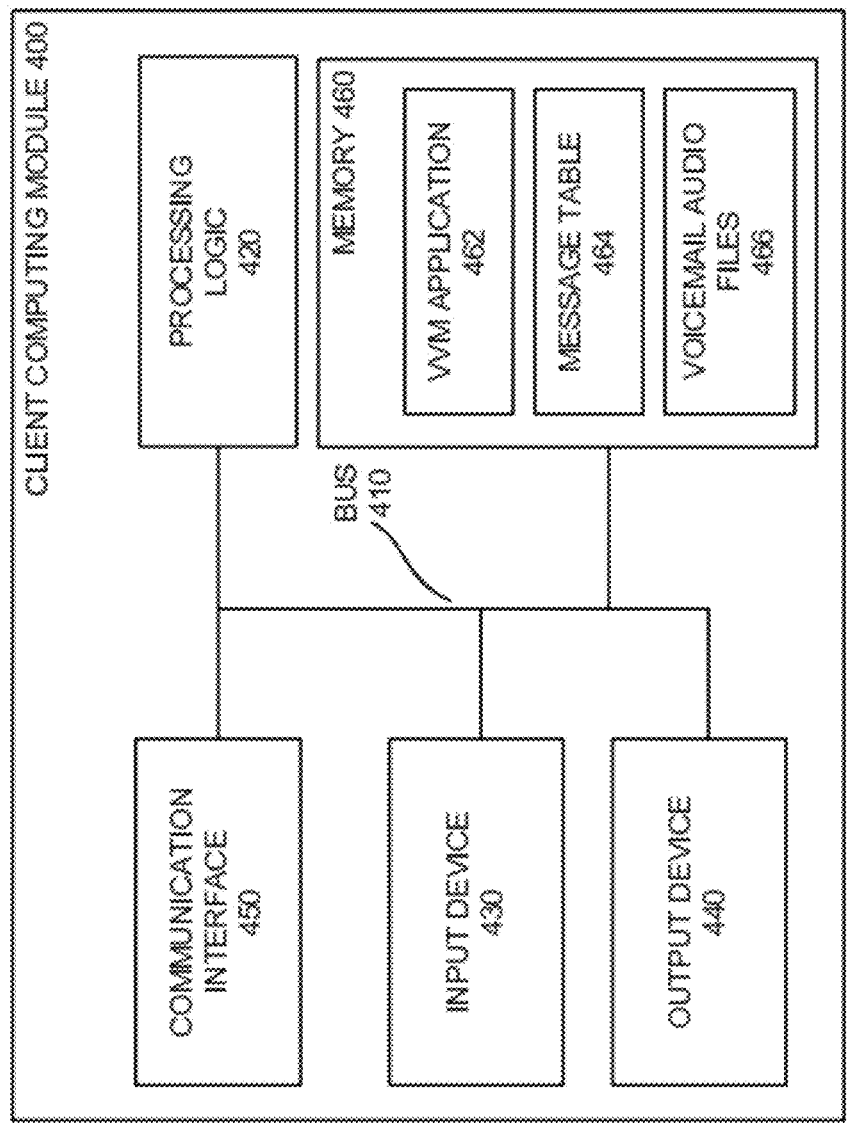
FIG. 4 is a block diagram of exemplary components of a client computer module.

FIG. 4 is a block diagram of exemplary components of a client computing module 400. User devices 208-220 may each include one or more computing modules 400. Client computing module 400 may include a bus 410, processing logic 420, an input device 430, an output device 440, a communication interface 450, and a memory 460. Client computing module 400 may include other components (not shown) that aid in receiving, transmitting, and/or processing data. Moreover, other configurations of components in client computing module 400 are possible.

Bus 410 may include a path that permits communication among the components of client computing module 400. Processing logic 420 may include any type of processor or microprocessor (or groups of processors or microprocessors) that interprets and executes instructions. In other embodiments, processing logic 420 may include an application-specific integrated circuit (ASIC), a field-programmable gate array (FPGA), or the like.

Input device 430 may include a device that permits a user to input information into client computing module 400, such as a keyboard (e.g., control keys 308 and/or keypad 310), a mouse, a pen, a microphone (e.g., microphone 312), a remote control, a touch-screen display (e.g., display 306), etc. Input device 430 may include an accelerometer that may allow client computing module to measure acceleration and movement of the device that includes the client computing module. Output device 440 may include a device that outputs information to the user, such as a display (e.g., display 306), a printer, a speaker (e.g., speaker 304), etc. Output device 440 may also include a vibrator to alert a user.

Input device 430 and output device 440 may allow the user to activate a particular service or application, such as a visual voicemail application and/or service. Input device 430 and output device 440 may allow the user to receive and view a menu of options and select from the menu options. The menu may allow the user to select various functions or services associated with applications executed by client computing module 400.

Communication interface 450 may include any transceiver-like mechanism that enables client computing module 400 to communicate with other devices and/or systems. Communication interface 450 may include a transmitter that may convert baseband signals to radio frequency (RF) signals and/or a receiver that may convert RF signals to baseband signals. Alternatively, communication interface 450 may include a transceiver to perform functions of both a transmitter and a receiver. Communication interface 450 may be coupled to an antenna for transmission and reception of the RF signals. Communications interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface for communicating with Bluetooth devices, a near-field communication (NFC) interface, etc. Communication interface 450 may implement a wireless communication protocol, e.g., GSM, CDMA, WCDMA, GPRS, EDGE, etc. Communications interface 450 may also receive, transmit and/or process digital or analog audio inputs/outputs and/or digital or analog video inputs/outputs.

Memory 460 may include a random access memory (RAM) or another type of dynamic storage device that may store information and instructions, e.g., an application, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions.

Memory 460 may include a VVM application 462, a voicemail message table 464 (e.g., database), and voicemail audio files 466. VVM application 462 may allow a user to receive, select, listen to, and act on (e.g., save, forward, delete) voicemail messages. Message table 464 may store a list of voicemail messages including information such as the date and time of a voicemail message, the duration of the message, the status of the message, etc. Voicemail audio files 466 may include audio data of voicemail messages (e.g., in any format, including MP3, WMA, AAC, QCP, QCEP, EVRC, AMR, Ogg Vorbis, etc.).

Client computing module 400 may perform certain operations, as described below. Client computing module 400 may perform these operations in response to processing logic 420 executing software instructions contained in a computer-readable medium, such as memory 460. A computer-readable medium may be defined as a physical or logical memory device. The software instructions may be read into memory 460 from another computer-readable medium or from another device via communication interface 450. The software instructions contained in memory 460 may cause processing logic 420 to perform processes that are described below.

Figure 5:
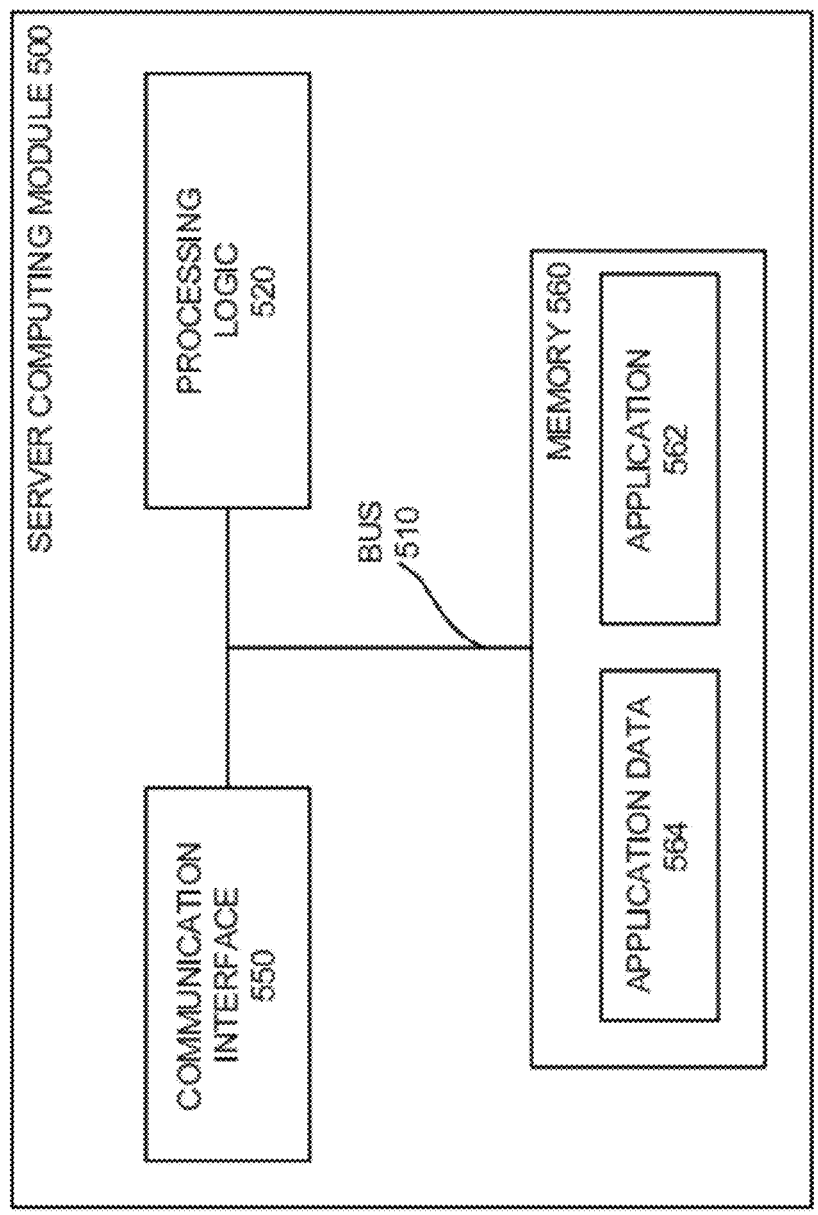
FIG. 5 is a block diagram of exemplary components of a server computing module.

FIG. 5 is a block diagram of exemplary components of a server computing module 500. Each of components 232-274 may include one or more server computing modules (e.g., a rack of server computer modules), such as computing module 500. Server computing module 500 may include a bus 510, processing logic 520, a communication interface 550, and a memory 560. Server computing module 500 may include other components (not shown) that aid in receiving, transmitting, and/or processing data. Moreover, other configurations of components in module 500 are possible.

Bus 510 may include a path that permits communication among the components of module 500. Processing logic 520 may include any type of processor or microprocessor (or groups of processors or microprocessors) that interprets and executes instructions. In other embodiments, processing logic 520 may include an ASIC, an FPGA, or the like.

Communication interface 550 may include any transceiver-like mechanism that enables module 500 to communicate with other devices and/or systems. Communication interface 550 may include a transmitter that may convert baseband signals from processing logic 520 to RF signals and/or a receiver that may convert RF signals to baseband signals. Alternatively, communication interface 550 may include a transceiver to perform functions of both a transmitter and a receiver. Communication interface 550 may be coupled to an antenna for transmission and reception of the RF signals. Communications interface 550 may include a network interface card, e.g., Ethernet card, for wired communications or a wireless network interface (e.g., a WiFi card) for wireless communications. Communication interface 550 may also include, for example, a USB port for communications over a cable, a Bluetooth wireless interface for communicating with Bluetooth devices, a NFC interface, etc. Communication interface 550 may implement a wireless communication protocol, e.g., GSM, CDMA, WCDMA, GPRS, EDGE, etc. Communications interface 550 may receive, transmit and/or process digital or analog audio inputs/outputs and/or digital or analog video inputs/outputs.

Memory 560 may include a RAM or another type of dynamic storage device that may store information and instructions, e.g., an application 562 and application data 564, for execution by processing logic 520; a ROM device or another type of static storage device that may store static information and instructions for use by processing logic 520; and/or some other type of magnetic or optical recording medium and its corresponding drive, e.g., a HDD, for storing information and/or instructions.

In the case of VM servers 232-236, for example, application 562 may include an application to receive voicemail messages on behalf of user devices, such as user devices 216-220, when the users of the devices do not answer call requests, for example. Application data 564 may include voicemail message tables and corresponding audio data.

In the case of VVM server 252, for example, application 562 may include an application to receive voicemail message information and corresponding voicemail audio data from VM servers 232-236 and deliver the received voicemail message information and corresponding voicemail audio data to user devices. As such, in the case of VVM server 252, application data 564 may also include voicemail message tables and corresponding audio files.

Module 500 may perform certain operations, as described in detail below. Module 500 may perform these operations in response to processing logic 520 executing software instructions contained in a computer-readable medium, such as memory 560. The software instructions may be read into memory 560 from another computer-readable medium or from another device via communication interface 550. The software instructions contained in memory 560 may cause processing logic 520 to perform processes that are described below.

FIG. 6A is a diagram of exemplary message tables 600-1, 600-2, and 600-3, e.g., databases (collectively "message tables 600"). Message tables 600 may each store information related to voicemail messages. Each entry (e.g., record) in message tables 600 may include information regarding a different voicemail message.

Message tables 600 may be stored in one or more of VM servers 232-236 (e.g., in memory 560). In one exemplary embodiment, message table 600-1 may store information regarding messages associated with smart phone 216; message table 600-2 may store information regarding messages associated with PDA 218; and message table 600-3 may store information regarding messages associated with mobile phone 220. In this exemplary embodiment, message table 600-1 may be stored in work VM server 232; message table 600-2 may be stored in home VM server 234; and message table 600-3 may be stored in wireless VM server 236. In other embodiments, message tables 600 may also be stored in another device in network 200, such as in VVM server 252 (e.g., in memory 560) or any of devices 208-220 (e.g., in memory 460 as message table 464).

Message tables 600 may include a mailbox identifier ("mailbox ID" or "MBID") field 602, a message identifier ("message ID" or "MID") field 604, a called device number (DN) field 605, a caller DN field 606, a state field 610, and a location field 612.

Mailbox ID field 602 may include a value identifying a mailbox in one of VM servers 232-236. In exemplary message tables 600, there are three mailboxes identified in mailbox ID field 602: MBA1, MBB1, and MBC1. In this example, MBA1 may be a mailbox in work VM server 232 associated with smart phone 216, MBB1 may be a mailbox in home VM server 234 associated with PDA 218 and, and MBC1 may be a mailbox in wireless VM server 236 associated with mobile phone 220.

Message ID field 604 may include a value that may uniquely identify a voicemail message in a mailbox. For example, record 652 in message table 600-1 stores a message identifier of A124 in message ID field 604.

Called DN field 605 may include a device number (e.g., phone number, mobile device number, URI, or URL) of the user device for which the corresponding voicemail message is intended. In exemplary message tables 600, there are three device numbers in called DN field 605: 2022513434, 7035678989, and 2023459292. In this example, the device number 2022513434 may be associated with mobile phone 220; the device number 2023459292 may be associated with PDA 218; and the device number 7035678989 may be associated with smart phone 216. In one embodiment, there may be a one-to-one relationship between a called DN and a mailbox ID, such that each called DN is associated with one mailbox ID and vice versa. In this embodiment, each of the mailbox ID and device number may identify a device (e.g., the mailbox ID may also be consider a device number).

Caller DN field 606 may include a device number (e.g., phone number, mobile device number, URI, or URL) of the user device associated with the depositing of the corresponding voicemail message. In exemplary message tables 600, the messages identified in records 652-656 were deposited by various different device numbers as indicated in field 606.

State field 610 may include one or more tags identifying the state (e.g., status) of the corresponding voicemail message. Tags in state field 610 may include NEW, HEARD, SAVED, and DELETED. The NEW tag may indicate a voicemail message that has not been listened to yet by the user. The HEARD tag may indicate a voicemail message that has been listened to by the user. The SAVED tag may indicate a voicemail message that the user requested be saved in one of user devices 208-220 and/or one of VM servers 232-236 for a number of days, e.g., 21 days. The DELETED tag may indicate a voicemail message that has been marked for deletion by, for example, a user device. Other tags in state field 610 are possible, such as BUSINESS to identify business voicemail message, PERSONAL to identify personal voicemail message, FAMILY to identify voicemail message from family members, URGENT to identify urgent messages, and NOT URGENT to identify non-urgent messages.

Location field 612 may indicate the location (e.g., filename and/or pathname, URL, or URI) of an audio file associated with the corresponding voicemail message. In one embodiment, the audio file may be stored locally and location field 612 may include the filename of the local file associated with the corresponding voicemail message. In another embodiment, the audio file may be stored remotely and location field 612 may include the remote location of the audio file associated with the corresponding voicemail message.

Message tables 600 may include additional, different, or fewer fields than illustrated in FIG. 6A. For example, message tables 600 may include a call time field that may include the date and time that the corresponding voicemail message was left in one of VM servers 232-236. As another example, message tables 600 may include a priority field that may specify the urgency (e.g., 1-10) of the corresponding voicemail message.

FIG. 6B is a block diagram of exemplary message tables 600-1', 600-2', and 600-3' (collectively message tables 600'). Message tables 600-1', 600-2', and 600-3' may represent message tables 600-1, 600-2, and 600-3, respectively, but at a different point in time. Message tables 600' may be referred to as "updated message tables 600'." Like exemplary message tables 600, exemplary message tables 600' include records 652, 654, and 656. Unlike message tables 600, however, message tables 600' include records 658, 660, and 662. In particular, message table 600-1' includes record 662 that does not appear in message table 600-1; message table 600-2' includes record 658 that does not appear in message table 600-2; and message table 600-3' includes record 660 that does not appear in message table 600-3. As shown in exemplary message tables 600', records 658, 660, and 662 each include a state of NEW in state field 610.

The data in message tables 600 and 600' are for exemplary purposes only. As shown, for example, message tables 600-1 and 600-1' store information for only one mailbox ID and one called DN (e.g., mailbox ID of MBA1 and called DN of 7035678989). Message tables 600-1 and 600-1' (and the other message tables) may store information for more than one mailbox ID and called DN, however. In addition, message tables 600 and 600' may store thousands or hundreds of thousands of records.

FIG. 7A is a block diagram of an exemplary aggregate message table 700, e.g., a database. Aggregate message table 700 may store information from one or more other message tables, such as message tables 600. Aggregate message table 700 may be stored in one or more of devices 208-220 (e.g., in memory 460 as message table 464). Aggregate message table 700 may also be stored in VVM server 252 (e.g., in memory 560) or another device in network 200.

Like message tables 600, each entry in aggregate message table 700 may include information regarding a different voicemail message. Further, aggregate message table 700 may include the same or similar fields as message tables 600. That is, aggregate message table 700 may include a mailbox ID field 702, a message ID field 704, a called DN field 705, a caller DN field 706, a state field 710, and a location field 712. Aggregate message table 700 may include additional, different, or fewer fields than illustrated in FIG. 7. These fields shown in FIG. 7 may store the same or similar information as descried above for fields 602-612 in FIG. 6A of message tables 600 or 600'.

Exemplary aggregate message table 700 may include records 752, 754, and 756, which may store the same information as records 652, 654, and 656, respectively, in message tables 600. Thus, aggregate message table 700 may be considered an "aggregate" table because it aggregates message information from a group of disparate message tables corresponding to different mailboxes, in this case message tables 600. In an alternative embodiment, message table 700 may store data from only one other message table.

FIG. 7B is a block diagram of an exemplary aggregate message table 700', which may represent aggregate message table 700 at a different point in time. Aggregate message table 700' includes records 752, 754, and 756 that also appear in aggregate message table 700. Aggregate message table 700' also includes records 758, 760, and 762 that do not appear in aggregate message table 700. Exemplary aggregate message table 700' may include records 758, 760, and 762, which may store the same information as records 658, 660, and 662, respectively, in message tables 600'. As shown, records 758, 760, and 762 each include a state of NEW in state field 710.

The data in aggregate message tables 700 and 700' are for exemplary purposes. Aggregate message tables 700 and 700' as shown, for example, store information for voicemail messages associated with a single user, e.g., the user related to smart phone 216, PDA 218, and mobile phone 220. Aggregate message tables 700 and 700' may store information associated with thousands even hundreds of thousands of users. In addition, aggregate message tables 700 and 700' may store thousands or hundreds of thousands of messages, for example.

FIG. 8 is a block diagram of an exemplary VVM table 800. VVM table 800 may store user device information and corresponding voicemail information. In exemplary VVM table 800, a device table 800-1 may store information about the user device and header table 800-2 may store visual voicemail information. VVM table 800 may be stored in VVM server 252 (e.g., in VVM database 253) or in another device in network 200. Data stored in VVM table 800 may be populated from information stored in, for example, devices 208-220, VM servers 232-236, SWD server 238, self provisioning server 272, and/or MTAS server 274. In one embodiment, VVM table 800, or data that is eventually stored in VVM table 800, may also be stored in SWD server 238, self provisioning server 272, or MTAS server 274. In one embodiment, a user may edit and update information stored VVM table 800 using, for example, a browser in computer 208.

VVM table 800 may include information for many devices and associated voicemail information. As such, VVM table 800 may include many records storing the information identified in device table 800-1 and header table 800-2, e.g., a record for each device. As such, VVM table 800 may include many records or, in other words, device table 800-1 and header table 800-2 may include many records.

Device table 800-1 may include a device number (DN) field 810, a primary key field 803, a personal identification number (PIN) field 804, a session cookie field 806, a cookie timer field 808, a mailbox ID field 810, a notification field 811, a name field 812, a device technology platform field (SRC) 814, a device software field (version) 816, a device model field 818, a text enable field 820, a comment field 822, and a last modified field 822. Header table 800-2 may include a device number field 852, a primary key field 854, a notification time field 856, and a header cache field 858. Device table 800-1 and header table 800-2 may include additional, different, or fewer fields than illustrated in FIG. 8.

DN field 802 may include the device number(s) (e.g., phone number, mobile device number, URI, or URL) of the user device associated with the corresponding mailbox in mailbox ID field 810 for receiving voicemail message information notifications. As shown in device table 800-1, the exemplary device number stored is 2022513434, which is associated with, for example, mobile phone 220.

Primary key field 803 may store a cryptographic key for encrypting data sent to and decrypting data received from the device identified in DN field 810. The cryptographic key in primary key field 803 may be a symmetric key shared with the user device using public/private asymmetric encryption, for example. In one implementation, the cryptographic key may be used for SSL or TLS security and encryption protocols. In one embodiment, primary key field 803 may include a randomly generated key. In another embodiment, primary key field 803 may include one of a limited number of keys. In still another embodiment, primary key field 803 may include a key generated from an algorithm, such as an algorithm that inputs the value in mailbox ID field 810, DN field 802, and the current time, for example.

PIN field 804 may include the password (such as a four-digit number) that a user or user device may use for accessing the voicemail mailbox identified in mailbox ID field 801. Storing the PIN in field 804 and the device number in field 802 may allow for VVM server 252 to request voicemail message headers and VM audio files from the appropriate VM server without requesting this information from the user device (e.g., thus saving wireless signaling between devices).

Session cookie field 806 may include characters that VVM server 252 may use to authenticate the user device identified in DN field 802. In one embodiment, session cookie field 806 may include a randomly generated cookie. In another embodiment, session cookie field 806 may include one of a limited number of cookies. In yet another embodiment, session cookie field 806 may include a cookie generated from an algorithm, such as an algorithm that inputs the value stored in mailbox ID field 801, DN field 802, and the current time, for example.

Cookie timer field 808 may store a value identifying the time that the cookie in session cookie field 806 was assigned and/or sent to the device identified in DN field 802. In one embodiment, the cookie identified in cookie field 806 may expire a certain time (e.g., 5, 15, 25, 45, 60, 120 minutes) after the time stored in cookie timer field 808.

Mailbox ID field 810 may include a value identifying a mailbox (e.g., a logical address) in one of the VM servers, e.g., one of VM servers 232-236, associated with the device number stored in DN field 802. The mailbox ID stored in MBID field 810 may be used by one of VVM servers 232-236 for identifying voicemail messages for a particular user device, subscriber, etc. Examples of mailboxes identified in mailbox ID field 602 include MBA1 (as shown in FIG. 8), MBB1, and MBC1. These three mailboxes correspond to the mailboxes stored in message tables 600 and aggregate message table 700, for example.

Notification field 811 may include the device number(s) (e.g., phone number, mobile device number, URI, or URL) of the user device associated with the corresponding mailbox in mailbox ID field 810 for receiving voicemail message information notifications. As indicated in device table 800-1, when mailbox MBA1 receives a new voicemail, for example, then the user device associated with device numbers 2022513434, 7035678989, and 2023459292 (e.g., mobile phone 220, smart phone 216, and PDA 218, respectively) may be notified.

Name field 812 may store the name of the user, e.g., the customer, associated with the device number stored in DN field 802.

SRC field 814 may store a value to indicate the device technology platform. The device technology platform may be used for identifying the SMS interface for sending messages to the device identified in DN field 802. Version field 816 may store a value indicative of the version of the software used in the device identified in DN field 802. Device model field 818 may store a value indicative of the model number of the device identified in DN field 802.

Text enable field 820 may store a value (e.g., YES or NO) indicative of whether the device identified in DN field 802 has subscribed to a voice-to-text service. Comment field 822 may include comments about the subscriber. Last modified field 824 may include a value indicative of the time the current record of device table 800-1 was modified.

DN field 852 may include the same information stored in DN field 802, but may be stored twice for convenience or redundancy. Primary key field 854 may store the same information as in primary key field 803, but may likewise be stored twice for convenience.

Notification time field 856 may include a value indicating the time that the information stored in header cache field 858 was sent to the device identified in DN field 852. In one embodiment, the header information stored in header cache field 858 may be erased a certain time (e.g., one hour, one day, one month, or one year, etc.) after the time stored in notification time field 856.

Header cache field 858 may include visual voicemail information that is sent to devices (such as the device identified in DN field 852). Devices may receive the information stored in header cache field 858 for displaying to the user of the device. As shown in exemplary header table 800-2 of FIG. 8, header cache field 858 may include records 754 and 760 shown in aggregate message table 700'. In one embodiment, header cache field 858 is stored in a ZIP or other compressed archive file. In one embodiment, header cache field 858 may store the portion of aggregate message table 700 associated with the device identified in DN field 802.

Storing header information in header cache field 858 may allow for VVM server 252 to forward these headers to devices (e.g., devices 208-220) without VVM server 252 reconnecting to a VM server. Thus, cache field 858 may help reduce connection time between a device and VVM server 252 (because the device may not have to wait for VVM server 252 to reconnect to the VM server). By the same reasoning, cache field 858 may help reduce the network traffic between VVM server 252 and a VM server. Reducing connection time may also help increase reliability of the connection, as wireless connections may be unreliable themselves and a reduction in the connection time may reduce the possibility of a connection failure. Header cache field 858 may also help reduce network traffic because a device may repeatedly try to repair an unreliable connection, e.g., the more reliable the connection the fewer repeat attempts by a wireless device.

As described below, a VVM network incorporating three distinct layers (e.g., device layer 202, application layer 206, and VM layer 204) may facilitate recovery and/or uninterrupted service (e.g., no loss of data, minimal down time) in the event of system failure in the middle layer (e.g., application layer 206). The three layers may also allow for recovery and/or uninterrupted service in the event of system failure in the other two layers (e.g., the device layer 202 and/or the VM layer 204). In one embodiment, application layer 206 may be a state-less and/or memory-less layer that passes information. In other embodiments, application layer 206 may store information on a temporary or permanent (e.g., redundant) basis, however, for other reasons, such as improved performance. In one embodiment, if application layer 206 (or part of application layer 206) fails or looses data, the data may be reconstituted or received from device layer 202 or VM layer 204 as a new application layer takes hold. In one embodiment, requests between device layer 202 and application layer 206 and between VM layer 204 and application layer 206 may include a state-less protocol, such as HTTP, to facilitate a state-less application layer 206.

Because application layer 206 may, in one embodiment, be state-less, data requests between the device layer 202 and application layer 206 and between VM layer 204 and application layer 206 may include the state parameters. For example, a data request from device layer 202 to application layer 206 may include state parameters such as a session cookie, a device number, mailbox ID, message ID, PIN, etc. In one embodiment, states may be permanently stored in device layer 202 (e.g., devices 208-220) or VM layer 204 (e.g., one of VM servers 232-236). In another embodiment, state parameters may be only temporarily stored in device layer 202 and/or VM layer 204.

A state-less application layer may allow for more efficient load-balancing of the data requests received in application layer 206. For example, data requests may be distributed more efficiently among different servers in a cluster.

As described below in FIGS. 9A-9F, 11A, 11B, 13A and 13B, VVM server 252 may, in one embodiment, send a light notification (e.g., SMS) to a user device regarding new voicemail information. A "light" notification may include a notification that does not require significant bandwidth or significant data transfer, at least compared to a "heavy" notification or communication. The user device may inspect the notification to determine whether it should generate a heavier request to download voicemail message information. In one embodiment, the voicemail message information may exclude the audio files of the voicemail messages. After receiving the voicemail message information, the user device may decide to make an even heavier request to download the voicemail audio files. In another embodiment, the notification, the request for the voicemail message information, and the request for the audio files are all heavy requests or any combination of heavy or light requests.

Figure 9A:
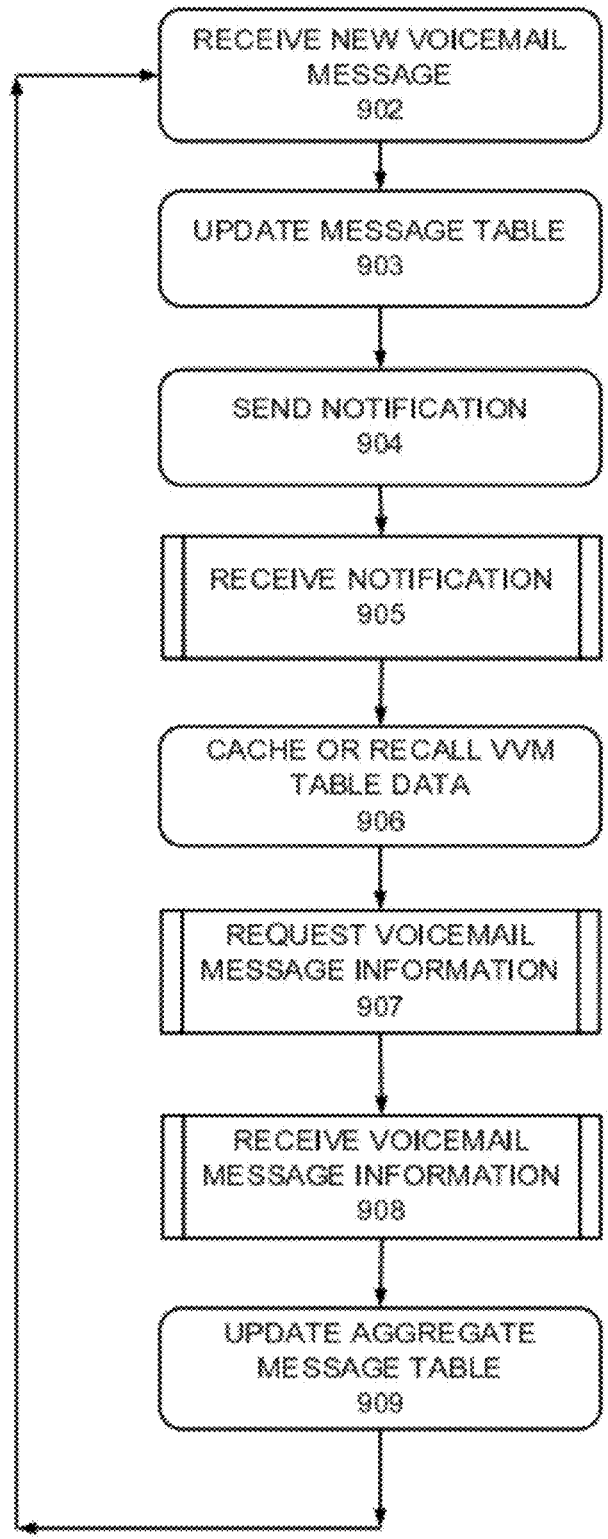
FIGS. 9A through 9F are flowcharts of exemplary processes for receiving a voicemail notification and notifying a user device of voicemail information.

FIG. 9A is a flowchart of an exemplary process 900A for receiving a voicemail message and for notifying a VVM server of voicemail information. FIG. 9A is described with respect to FIG. 10A, which is a diagram of exemplary network signals for notifying a user device of voicemail information. For the purposes of FIG. 10A, device proxy 254, SMPP gateway 256, notification server 260, and VVM gateway 262 have been omitted for simplicity. All or parts of process 900A may run in work VM server 232, home VM server 234, wireless VM server 236, VVM server 252, and/or any of user devices 208-220.

Process 900A may begin when a new voicemail message is received (block 902). For example, mobile phone 220 (e.g., device number 2022513434) may receive a call request from another device (e.g., device number 4569812124). Mobile phone 220, however, may not accept (e.g., not answer) the call request, which may cause the call request to be directed to wireless VM server 236, and wireless VM server 236 may receive a voicemail message. A message table may be updated (block 903). Wireless VM server 236 may associate the received voicemail message with a message ID (e.g., a message ID of C130), the called DN (e.g., 2022513434), and the caller DN (e.g., 4569812124) and wireless VM server 236 may store this information in its message table, e.g., message table 600-3. In this example, wireless VM server 236 may update message table 600-3 to include record 660, as shown in message table 600-3'. Wireless VM server 236 may also store the mailbox ID (e.g., MBC1), the state (e.g., NEW), and the filename of the audio data (e.g., MSG4.QCP) in record 660.

Notification of voicemail message information may be sent (block 904). Having received a new voicemail (e.g., the voicemail message associated with record 660), wireless VM server 236 may send a notification (signal 1002) to VVM server 252 of the new voicemail. The notification message (signal 1002) may include the called DN, e.g., 2022513434 from field 605, and the mailbox ID, e.g., MBC1 from mailbox ID field 602. Wireless VM server 236 may send the notification (signal 1002) to VVM server 252 through notification server 260 (shown in FIG. 2A), for example, according to a process 900D discussed below with respect to FIG. 9D.

In one embodiment, the notification message (signal 1002) may include an SMPP message. In one embodiment, the change of the message table in the VM server (e.g., the addition of record 660 to message table 600-3' in wireless VM server 236) may prompt the sending of the notification message (signal 1002). In this example, the notification of voicemail message information may be the result of a new voicemail message. Notifications may also be sent for other reasons, such as a state change in state field 610 of a voicemail message. In another embodiment, notification messages, such as signal 1002, may additionally or alternatively be sent on a periodic basis.

The notification of voicemail message information may be received (block 905). VVM server 252 may receive the notification (signal 1002) of voicemail message information. VVM server 252 may receive the notification (signal 1002) according to a process 900B, discussed below with respect to FIG. 9B. VVM table data may be recalled or cached (block 906). For example, the notification (signal 1002) includes information that may be used to recall the appropriate record stored in VVM table 800 or information to be stored in VVM table 800. If a record for the DN and MBID identified in the notification (signal 1002) does not exist in VVM table 800, a new record may be created. The notification message (signal 1002) may include the called DN, e.g., 2022513434, that may be stored in DN fields 802 and 852 of device table 800-1 and header table 800-2. The notification (signal 1002) may also include the mailbox ID, e.g., MBC1, that may be stored in MBID field 810 of device table 800-1.

Voicemail message information may be requested (block 907). In response to signal 1002, VVM server 252 may send a request (signal 1004) for information regarding the voicemail messages stored by wireless VM server 236. VVM server 252 may send the request (signal 1004) to wireless VM server 236 through VVM gateway 262 (shown in FIG. 2A), for example. The request (signal 1004) may include the called DN (e.g., of mobile phone 220 received earlier in signal 1002), the mailbox ID (e.g., MBC1 received earlier in signal 1002), and a PIN associated with the mailbox ID. The PIN may be stored in PIN field 804 of device table 800-1 if the appropriate record was recalled in block 905. In one embodiment, if device table 800-1 does not have the PIN associated with the mailbox ID, or if the PIN was not correct, then VVM server 252 may request the PIN from mobile phone 220 according to process 900E discussed below with respect to FIG. 9E.

Information regarding voicemail messages may be received (block 908). VVM server 252 may receive voicemail message information (signal 1006) from wireless VM server 236. Wireless VM server 236 may send voicemail message information (signal 1006) in response to receiving the request (signal 1004) for information regarding voicemail messages. VVM server 252 may receive the voicemail message information (signal 1006) according to a process 900C, discussed below with respect to FIG. 9C. Wireless VM server 236 may send the information (signal 1006) to VVM server 252 through VVM gateway 262 (shown in FIG. 2A), for example, according to process 900D discussed below with respect to FIG. 9D. The voicemail message information (signal 1006) may include a list of voicemail messages associated with the device number (DN) (or an account associated with the DN) included in the request (signal 1004). In one embodiment, the information may include XML formatted data including message IDs and the corresponding state (e.g., the information stored in state field 610).

In the current example where mobile phone 220 receives a voicemail message, the information in signal 1006 may include message IDs C129 and C130 from message ID field 604. The information in signal 1006 may also include the states associated with the two messages, e.g., NEW for the voicemail message associated with message ID C130 (record 660) and HEARD for the voicemail message associated with message ID C129 (record 654). In one embodiment, signal 1006 may include information related to only the records that prompted notification signal 1002 in the first place, e.g., the records that are new or have changed information.

VVM server 252 may update an aggregate message table with voicemail message information (block 909). For example, before receiving the information (signal 1006) regarding voicemail messages, VVM server 252 may store an aggregate message table (similar to aggregate message table 700) which does not include a record corresponding to the information in record 660 of message table 600-3' of FIG. 6B. After receiving the information (signal 1006) regarding voicemail messages, VVM server 252 may update its aggregate message table to include the information in record 760 as shown in aggregate message table 700', which corresponds to record 660 of message table 600-3', e.g., the information of which was received in signal 1006. In one embodiment, header cache field 858 may store aggregate message table 700. As such, updating aggregate message table 700 may include caching the header information in header cache field 858. In another embodiment, header cache field 858 is not updated until the header information is sent to a user device, such as mobile phone 220. In this embodiment, aggregate message table 700' may be used as a working memory, for example.

In another embodiment, VVM server 252 may request voicemail message information (e.g., by sending signal 1004) on a periodic basis in addition to or alternatively to waiting for a notification (e.g., signal 1002). In this embodiment, VVM server 252 may periodically request voicemail message information from each VM server, such as VM servers 232-236.

Work VM server 232 and home VM server 234 may also implement portions of process 900A. For example, home VM server 234 may receive a voicemail message (block 902) for an unanswered call to PDA 218. Information regarding this voicemail may be stored (block 903) as record 658 in message table 600-2'. Home VM server 234 may send (block 904) a notification signal (similar to signal 1002) for receipt (block 905) by VVM server 252. VVM server 252 may request (block 907) and receive (block 908) voicemail information from home VM server 234. VVM server 252 may update (block 909) its aggregate message table to include the information in record 758 (the information received from home VM server 234), as shown in exemplary aggregate message table 700'. In this example, VVM table 800 may include another record (not shown) corresponding to mailbox ID MBB1 and device number 2023459292 (e.g., records 756 and 758).

Work VM server 232 may also receive a voicemail message (block 902) for an unanswered call to smart phone 220. Information regarding this voicemail may be stored (block 903) as record 662 in message table 600-1'. Work VM server 232 may send (block 904) a notification signal (similar to signal 1002) for receipt (block 905) by VVM server 252. VVM server 252 may request (block 907) and may receive (block 908) voicemail information from work VM server 232. VVM server 252 may update its aggregate voicemail message table to include the information in record 762 as shown in aggregate message table 700'. In this example, VVM table 800 may include another record (not shown) for records corresponding to mailbox ID MAB1 and device number 7035678989 (e.g., records 762 and 752)

As shown, in response to a voicemail message left in each of VM servers 232-236, aggregate message table stored in VVM server 252 may be updated from the condition shown in exemplary message table 700 to that shown in shown in aggregate message table 700'. The aggregate message table stored in VVM server 252 may then reflect the current state of messages from the many VM servers, such as work VM server 232, home VM server 234, and wireless VM server 236.

Figure 9B:
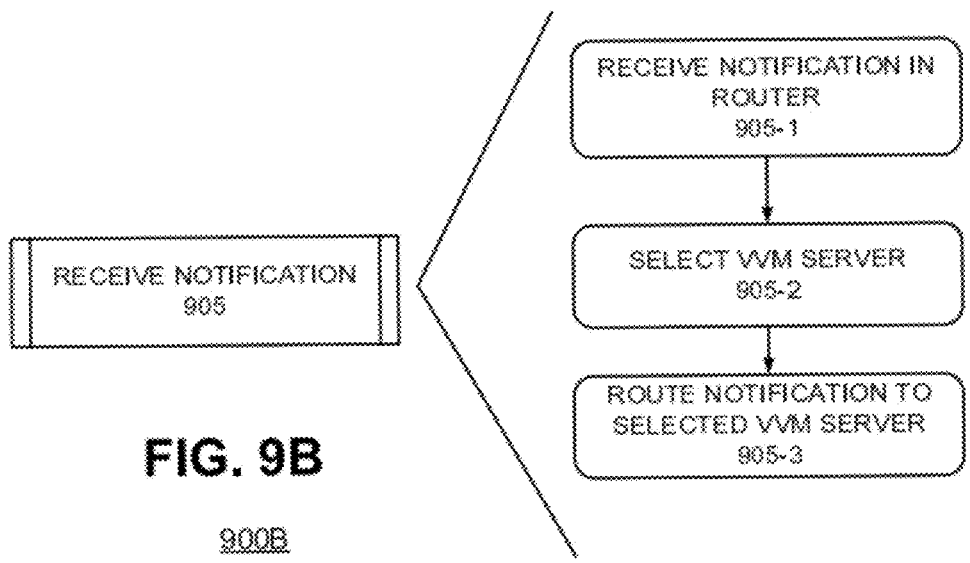

FIG. 9B is a flowchart of an exemplary process 900B for load balancing the receipt of the notification (signal 1002) of voicemail message information in VVM server 252, as discussed above with respect to block 905 in FIG. 9A. The notification (signal 1002) may be received in router 252-R (block 905-1). Router 252-R may select one of VVM servers 252-1 through 252-5 (block 905-2). For example, router 252-R may select the VVM server in a round-robin fashion (e.g., first server 252-1, then server 252-2, etc.). In another implementation, router 252-R may select the VVM server in a random fashion. In still another implementation, router 252-R may select the VVM server based on the current processing load and processing speed of the VVM server. For example, if VVM server 252-1 is currently very busy, then router 252-R may select one of the other VVM servers, such as VVM server 252-5 if it is not busy. Router 252-R may determine which router is busy by receiving information from each of VVM server 252-x or by measuring the instantaneous power consumption of each server (e.g., the more power being drawn, the more busy the server). Router 252-R may route the notification (signal 1002) to the selected VVM server (block 905-3).

Figure 9C:
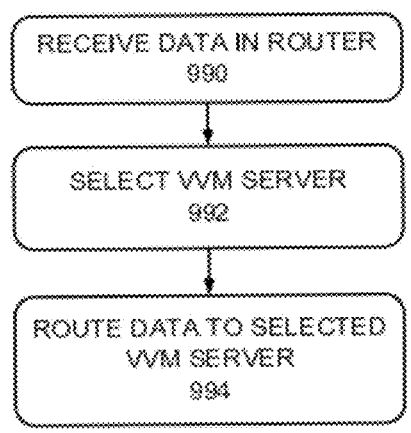

Process 900B can be generalized for VVM server 252 to include data other than the notification (signal 1002). FIG. 9C is a flowchart of an exemplary process 900C for load balancing the receipt of data (any data, not just signal 1002) in VVM server 252. As discussed above, VVM server 252 may receive voicemail message information (signal 1006) from wireless VM server 236 (block 908). In this situation, router 252-R may receive the data (e.g., voicemail message information) (block 990). Router 252-R may select VVM server 252-x (block 992), in a manner similar to block 905-2 discussed above. Router 252-R may then send the data (e.g., voicemail message information) to the selected VVM server 252-x.

Figure 9D:
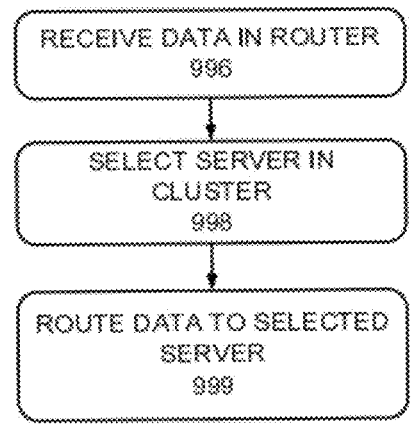

As discussed above, other components of network 200 may include a cluster of servers with a router similar to the configuration of VVM server 252 shown in FIG. 2C. In this case, process 900C can be generalized even more to include VVM database 253, VVM server 252, transcoding server 270, notification server 260, and/or VVM gateway 262. FIG. 9D is a flowchart of an exemplary process 900D for load balancing the receipt of data in a cluster of servers, such as VVM database 253, VVM server 252, transcoding server 270, notification server 260, and/or VVM gateway 262. For example, as discussed above, wireless VM server 236 may send (block 904) the notification (signal 1002) to VVM server 252 through notification server 260 (shown in FIG. 2A). As another example, wireless VM server 236 may also send (discussed in connection with block 908) the voicemail message information (signal 1006) to VVM server 252 through VVM gateway 262 (shown in FIG. 2A).

In this case, a router may receive the data (block 996). For example, the router in VVM gateway 262 may receive the voicemail message information (signal 1006). As another example, the router in notification server 260 may receive the notification (signal 1002). The router may select one of the servers in the servers in the cluster (block 998). The router may select the server in a manner similar to the manner discussed above with respect to block 905-2. The router may route the data to the selected server (block 999).

Figure 9E:
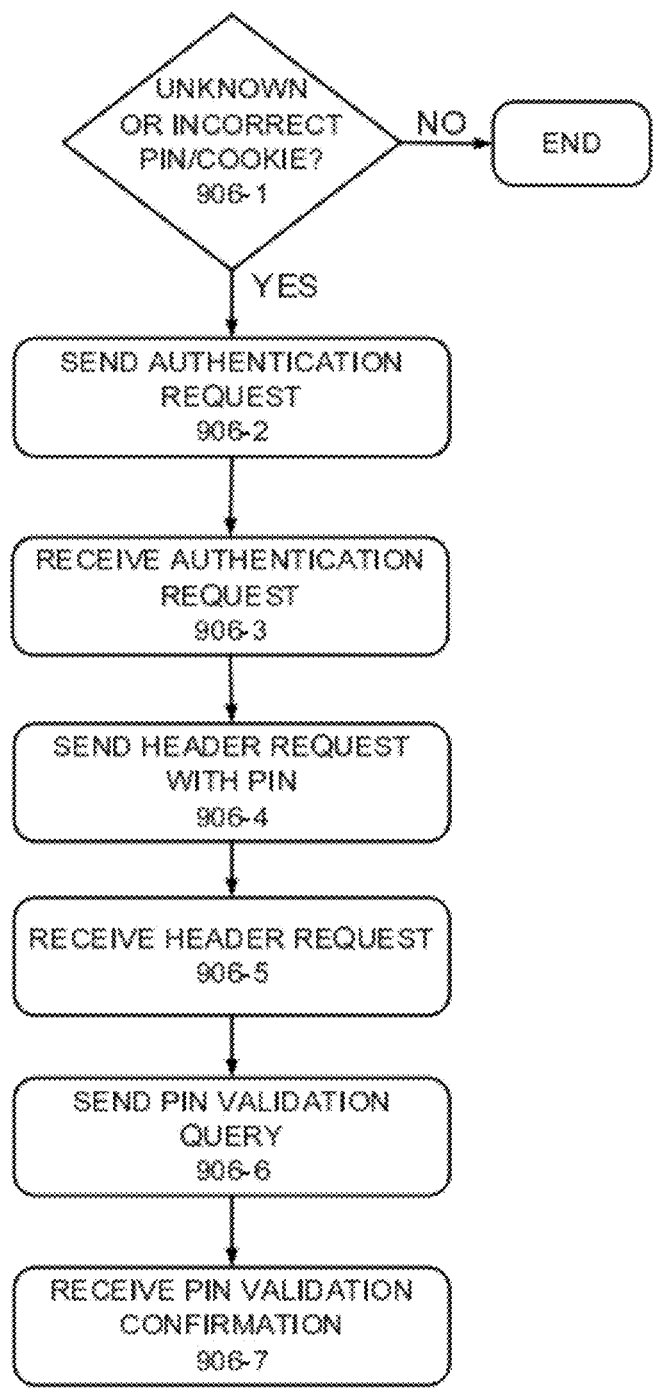

FIG. 9E is a flowchart of an exemplary process 900E for receiving a PIN for a mailbox. FIG. 9E is discussed in relation to FIG. 10B, which is a diagram of exemplary network signals for receiving a PIN for a mailbox. As discussed above, VVM server 252 may send a request (signal 1004 in FIG. 10A) (block 907 in FIG. 9A) to wireless VM server 236 that includes the PIN associated with the mailbox ID. Process 900E may begin with VVM determine whether device table 800-1 does not have the PIN associated with the mailbox ID, or if the PIN is not correct (block 906-1), then an authentication request may be sent (block 906-2) to the user device. For example, VVM server 252 may send an authentication request (signal 1052 in FIG. 10B) to mobile phone 220. The authentication request (signal 1052) may include the mailbox ID corresponding to the request (signal 1004 in FIG. 10A).

The authentication request may be received (block 906-3). For example, the user device (e.g., mobile phone 220) may receive the authentication request (signal 1052) that includes the mailbox ID. In response, a header request (e.g., a connection or login request) may be sent (block 906-4). For example, mobile phone 220 may send a header request (signal 1054) to VVM server 252 and/or device proxy 254. The header request (signal 1054) may include a request for a list of voicemail messages (e.g., voicemail message headers).

The header request may be received (block 906-5). For example, the header request (signal 1054) sent by mobile phone 220 may be received by VVM server 252. The header request (signal 1054) may include the device number (e.g., for mobile phone 220), the mailbox ID (MID), and/or a PIN. In one embodiment, the user of mobile phone 220 may be prompted for the PIN and/or the PIN may be stored in mobile phone 220 and automatically provided. The user may be prompted, for example, if the user changed the PIN in the VM server through customer service or by calling the VM server itself.

A PIN validation query may be sent (block 906-6). To validate the PIN (e.g., authenticate the user device) VVM server 252 may send a PIN validation query (signal 1056) to wireless VM server 236. The PIN validation query (signal 1056) may include the PIN and mailbox ID received from the user device, e.g., mobile phone 220, in the header request (signal 1054). Wireless VM server 236 may determine whether the PIN validation message (signal 1056) includes the correct PIN for the device number and mailbox combination.

A PIN validation confirmation may be received (block 906-7). If the PIN validation message (signal 1056) includes the correct PIN, then a confirmation message (signal 1058) may indicate a successful user validation. If the PIN validation message (signal 1204) does not include the correct PIN, then confirmation message (signal 1058) may indicate a failed user validation (e.g., failed authentication). If successful, VVM server 252 may store the PIN, the mailbox ID, and the device number for subsequent communications in device table 800. In addition, a cookie may be sent to the user device to authenticate subsequent communications, as described below with respect to process 1100A in FIG. 11 (block 1112). Further, VVM server 252 may provide the user device with a list of headers, as requested (signal 1054) according to process 1100 described below (block 1114).

Figure 9F:
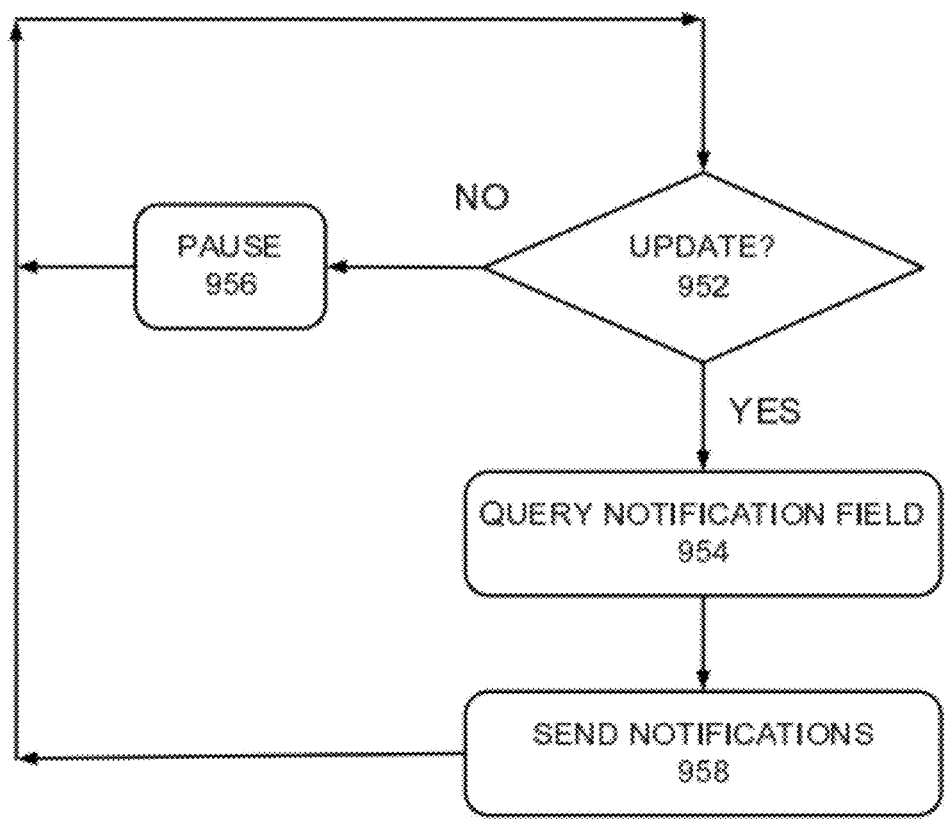

FIG. 9F is a flowchart of an exemplary process 900F for notifying a user device of voicemail message information. FIG. 9F is also described with respect to FIG. 10A. Process 900F may begin when VVM server 252 updates its aggregate message table, such as aggregate message table 700. For example, as discussed above with respect to process 900A, VVM server 252 may have updated its aggregate message from the condition shown in aggregate table 700 to the state shown in updated aggregated message table 700' (e.g., to add record 760 associated with mailbox MBC1). If the aggregate message table has been updated (block 952: YES), then a notification field may be queried (block 954). VVM server 252 may query VVM table 800 stored in SWD server 238 to determine which user devices should be notified of the change to the aggregate message table. In this example, as indicated in VVM table 800 (e.g., notification field 811), a notification for a new voicemail in mailbox MBC1 may be sent to the user device associated with device number 2022513434 (e.g., mobile phone 220), the user device associated with device number 7035678989 (e.g., smart phone 216), and the user device associated with device number 2023459292 (e.g., PDA 218).

Figure 10A:
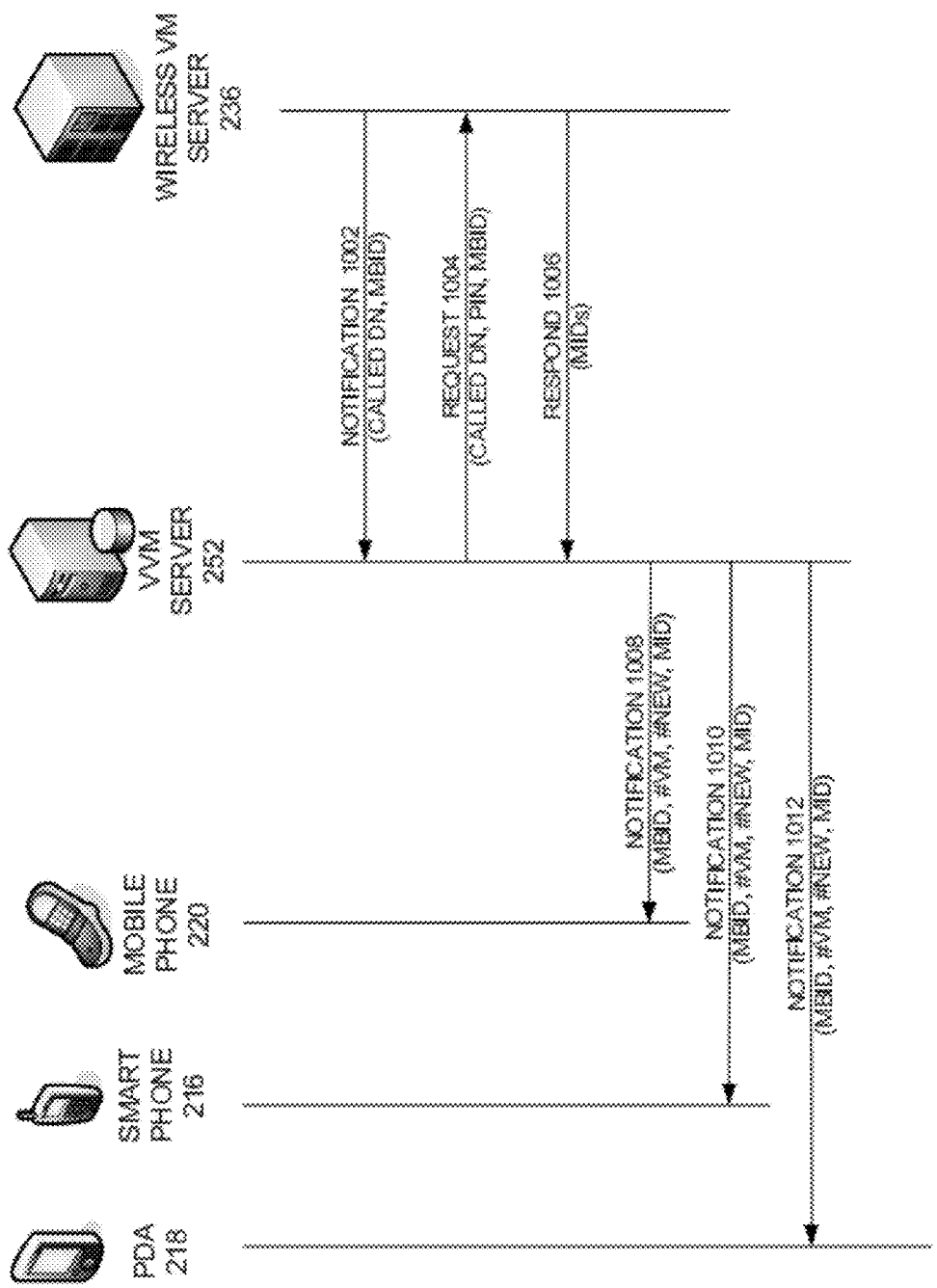
FIG. 10A is a diagram of exemplary network signals for notifying a user device of voicemail information.
Figure 10B:
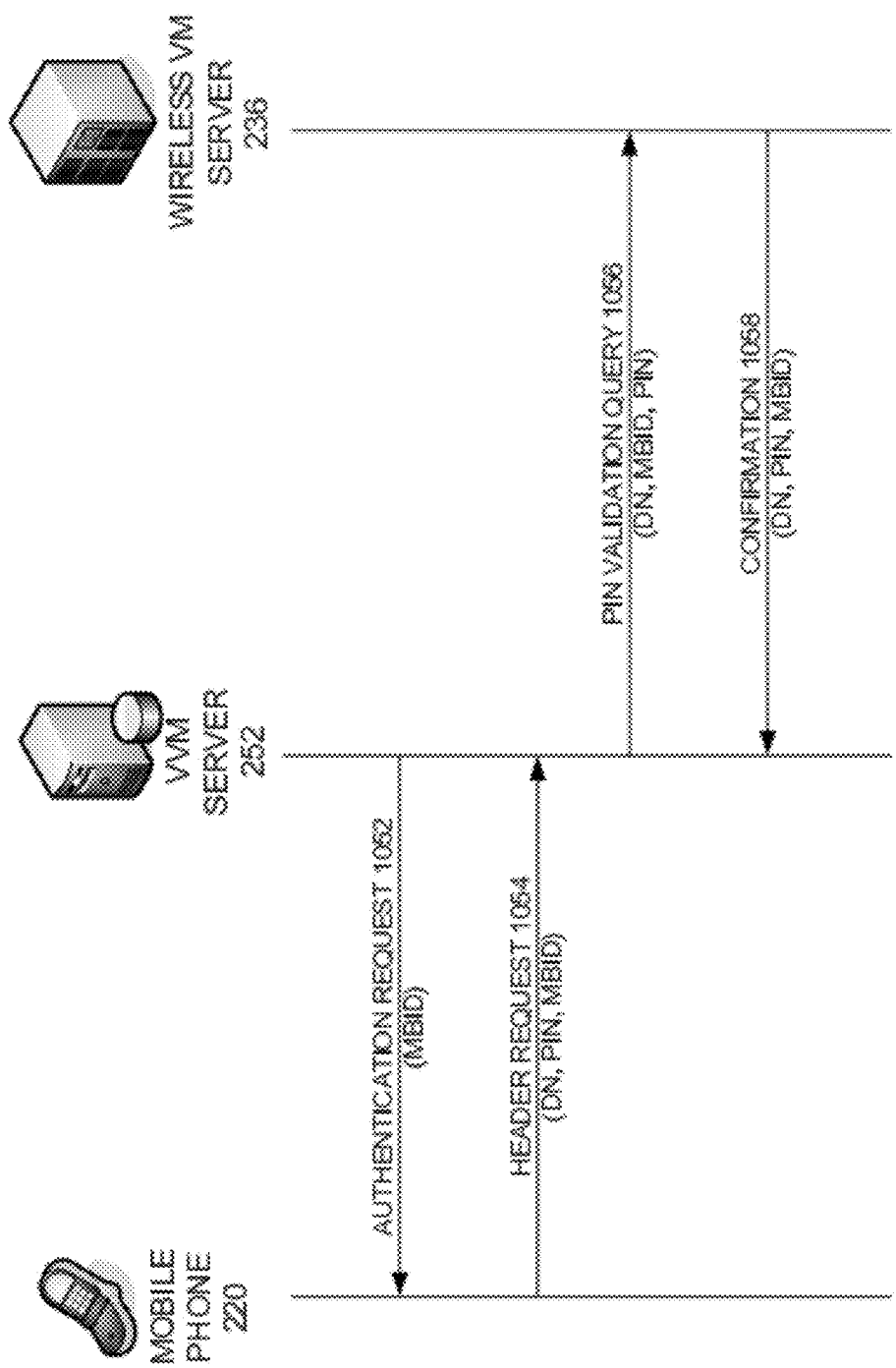
FIG. 10B is a diagram of exemplary network signals for receiving a personal identification number associated with a voicemail mailbox.

One or more user devices may be notified (block 958). Exemplary notification messages are shown in FIG. 10A, where VVM server 252 sends notification messages (signals 1008, 1010, and 1012) to mobile phone 220, PDA 118, and smart phone 216 (e.g., through device proxy 254 and/or SMPP gateway 256, shown in FIG. 2A). In one embodiment, signals 1008 through 1012 may all include the same or similar information.

In one embodiment, the notification (e.g., signal 1008) may include, for a particular mailbox ID, the number of voicemail messages (#VM), the number of new messages (#NEW), and the message ID of the most recent new voicemail message. The notification (e.g., signal 1008) may also include the mailbox ID to which the notification signal corresponds (e.g., the mailbox ID associated with the change in the aggregate message table that may have resulted in the notification message). In one embodiment, the notification (e.g., signal 1008) may also include the message IDs of all the voicemail messages currently in the mailbox.

In one embodiment, VVM server 252 may send the notification to user device(s) in an order specified by a user in VVM table 800. In another embodiment, VVM server 252 may send the notification first to the user device currently being used as measured by an accelerometer, for example. In yet another embodiment, VVM server 252 may determine which device is currently being used based on presence information stored in the user device, for example.

In one embodiment, the notification (e.g., signal 1008) may include an SMS message. In this embodiment, the SMS message (e.g., signal 1008) may include a BREW (Binary Run Time Environment for Wireless) application message in an SMS message. In another embodiment, the SMS message (e.g., signal 1008) may include a MWI (Mail Waiting Indicator) message. In one embodiment, the notification (e.g., signal 1008) is light (such as an SMS), which may make the notification fast and reliable.

After sending notifications (block 958), process 900F may return to block 952. In addition, if there has been no update to the aggregate message table (block 952: NO), then process 900F may pause (block 956) and may return to block 952 for processing at a next polling interval.

As shown above with respect to process 900A, VVM server 252 may update its aggregate message table for mailboxes MBB1 and MBA1, as well as MBC1. These updates may also prompt a query to VVM table 800 (block 954) and notifications being sent (block 958). In one embodiment, a notification (e.g., signal 1008) may include information for a group of mailbox IDs, such as MBB1, MBA1, and MBC1. For example, a notification signal may include, for a group of mailbox IDs, the number of voicemail messages (#VM) for each mailbox ID, the number of new messages (#NEW) for each mailbox ID, and the message ID of the most recent new voicemail message for each mailbox ID. In this embodiment, the notification (e.g., signal 1008) may also include the mailbox IDs to which the notification signal corresponds.

Figure 11A:
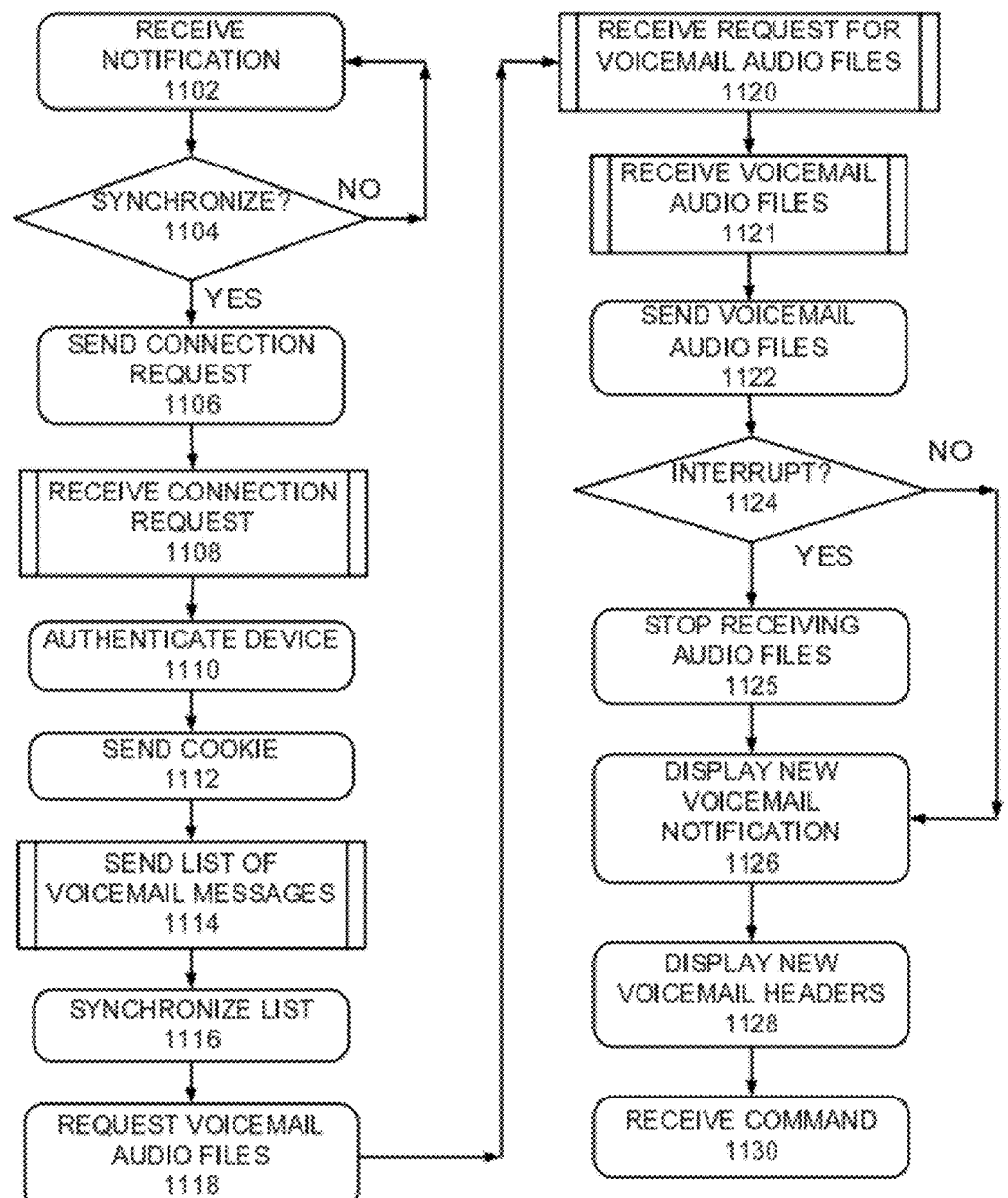
FIG. 11A is a flowchart of a process for synchronizing voicemail message information.
Figure 12:
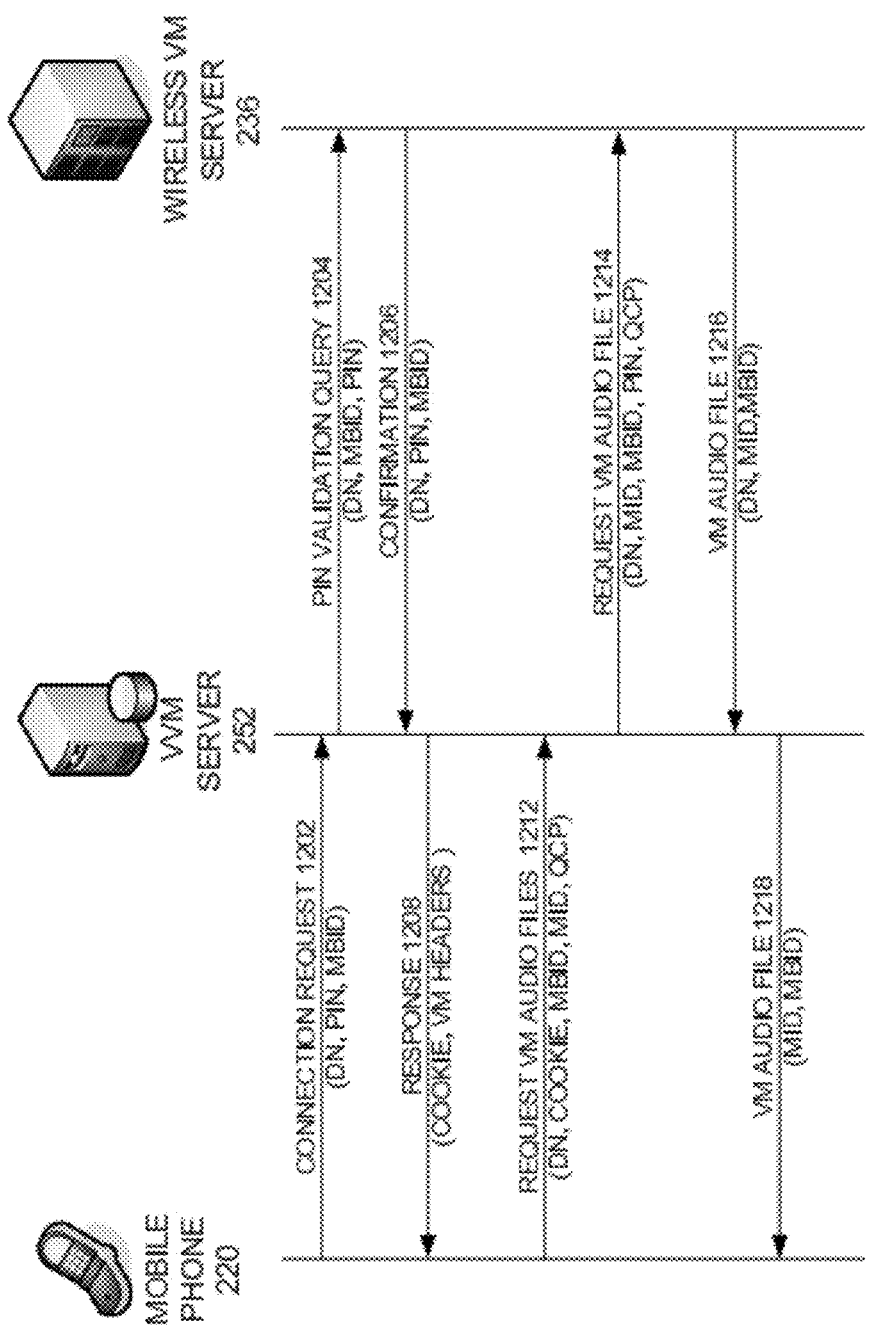
FIG. 12 is a diagram of exemplary network signals for synchronizing voicemail message information.

After receiving notification of voicemail messages, a user device may determine to download some or all of the voicemail message information identified in the notification. FIG. 11A is a flowchart of a process 1100A for receiving voicemail message information. All or parts of process 1100A may be performed by a user device, such as one of user devices 208-220, VVM server 252, or another device in network 200. Process 1100 is described with respect to FIG. 10A and FIG. 12, which are diagrams of exemplary network signals passed in network 200 for receiving a voicemail message and/or authenticating a user device. For the purposes of FIG. 12, device proxy 254, SMPP gateway 256, notification server 260, and VVM gateway 262 have been omitted for simplicity.

Process 1100A may start when a user device receives a notification message, e.g., signal 1008 (block 1102). In one embodiment, the notification (signal 1008) may trigger the launching of VVM application 462. For example, the notification (signal 1008) may trigger the user device to perform process 1100.

A determination of whether to synchronize may be made (block 1104). For example, mobile phone 220 may receive the notification message (signal 1008) and may compare the information in the notification message (signal 1008) with information already stored in mobile phone 220. Mobile phone 220 may determine that it does not have the most recent voicemail message information (block 1104: YES) and may initiate a synchronization with VVM server 252 to receive the most recent voicemail information.

In one embodiment, the user device, e.g., mobile phone 220, may determine whether to synchronize or not based, for a particular mailbox ID, for example, on the number of unheard (e.g., new) messages, the total number of messages, and/or the newest message ID. In yet another embodiment, the user device, e.g., mobile phone 220, may determine whether to synchronize or not based, for a group of mailbox IDs, for example, on the number of unheard messages, the total number of messages, and/or the newest message IDs for the group of mailbox IDs. In another embodiment, the user device, e.g., mobile phone 220, may determine whether to synchronize or not based, for a particular mailbox ID, only on this information (i.e., the number of unheard messages, the total number of messages, and/or the newest message ID). Further, the user device, e.g., mobile phone 220, may determine whether to synchronize or not based, for a group of mailbox IDs, only on this information (i.e., the number of unheard messages, the total number of messages, and/or the newest message IDs for the group of mailbox IDs). In another embodiment, mobile phone 220 may determine whether to synchronize or not based on additional information, such as the full list of voicemail message IDs.

The notification (e.g., signal 1008) may include a message that the device should synchronize, without necessarily specifying any other information. In another embodiment, mobile phone 220 may determine whether to synchronize on a periodic basis no matter the information in the notification (signal 1008).

If the notification message (signal 1008), for example, includes a most recent message ID of which mobile phone 220 is unaware, then mobile phone 220 may decide to synchronize (block 1104: YES). If the notification message (signal 1008) indicates that the number of unheard messages is different than the information stored in mobile phone 220, then mobile phone 220 may decide to synchronize (block 1104: YES). If the notification message (signal 1008) indicates that the total number of messages is different than the information stored in mobile phone 220, then mobile phone 220 may decide to synchronize (block 1104: YES). In one embodiment, mobile phone 220 may display the number of unheard (e.g., new) voicemail messages and the total number of voicemail messages to the user of mobile phone 220.

For example, mobile phone 220 may include an aggregate message table in the state shown in aggregate message table 700, whereas VVM server 252 may include an aggregate message table in the state shown in aggregate message table 700'. The notification message (signal 1008) sent from VVM server 252 to mobile phone 220 may include information regarding aggregate message table 700', such as the total number of voicemail messages (e.g., 2 for mailbox ID of MBC1), the number of new voicemail messages (1 for mailbox ID of MBC1), and the most recent message ID (e.g., C130 for mailbox ID of MBC1). Mobile phone 220 may determine that synchronization should be performed because, comparing the received information (signal 1008) to the information in its aggregate message table (in the state shown in table 700), mobile phone 220 may have incomplete information. For example, the aggregate message table in mobile phone 220 would suggest the number of voicemail messages would be 1 (not 2) and there are no new voicemail messages (rather than 1). In one embodiment, the notification (signal 1008) may include three separate signals, e.g., one for each mailbox ID.

If the user device does not synchronize (block 1104: NO), then process 1100 may return to block 1102 for receipt of a next notification. If the user device decides to synchronize (block 1104: YES), then a login or connection request may be sent (block 1106). For example, mobile phone 220 may send a connection request (signal 1202 in FIG. 12) to VVM server 252 and/or device proxy 254. The connection request may be received (block 1108). For example, the connection request (signal 1202) sent by mobile phone 220 may be received by VVM server 252. In one embodiment, the connection request is received according to process 900C (load balancing). In one embodiment, the connection request (signal 1202) may include a request for voicemail message headers (e.g., a list of voicemail messages). The connection request (signal 1202) may include the device number (e.g., for mobile phone 220), the mailbox ID, and/or a PIN. In one embodiment, the user of mobile phone 220 may be prompted for the PIN and/or the PIN may be stored in mobile phone 220 and automatically provided.

The user device may be authenticated (block 1110). To authenticate the user device, such as mobile phone 220, VVM server 252 and/or device proxy 254 may send a PIN validation query (signal 1204) to wireless VM server 236. The PIN validation query (signal 1204) may include the PIN and mailbox ID received from the user device, e.g., mobile phone 220, in the login request (signal 1202). Wireless VM server 236 may determine whether the PIN validation message (signal 1204) includes the correct PIN for the device number and mailbox combination. If the PIN validation message (signal 1204) includes the correct PIN, then a confirmation message (signal 1206) may indicate a successful user validation. If the PIN validation message (signal 1204) does not include the correct PIN, then confirmation message (signal 1206) may indicate a failed user validation (e.g., failed authentication). If successful, VVM server 252 and/or device proxy 254 may store the PIN, the mailbox ID, and the device number for subsequent communications with VM servers 232-236.

A cookie may be sent (block 1112). After successful authentication, VVM server 252 and/or device proxy 254 may respond to mobile phone 220 with a login response message (signal 1208). The login response message (signal 1208) may include the device number of mobile phone 220, mailbox ID of mobile phone 220, and a session cookie. In one embodiment, the session cookie may include an expiration time or be associated with an expiration time. For example, the session cookie may expire after fifteen minutes, one half of an hour, an hour, etc. In one embodiment, authentication server 258 may provide VVM server 252 and/or device proxy 254 with the session cookie for forwarding to mobile phone 220. In one embodiment, the session cookie may be used by mobile phone 220 in future communications to authenticate mobile phone 220. In one embodiment, VVM server 252 and/or device proxy 254 may communicate with authentication server 258 to validate any cookies received from mobile phone 220.

In one embodiment, if the user device, such as mobile phone 220, does not receive a response (signal 1208), e.g., from VVM server 252, the user device may be in an environment where data transfers are not possible. In this situation, the user device may implement the traditional user interface (TUI) for receiving voicemail message, such as requiring the user to call one of VM servers 232-236. In this situation, the user may use the user device to call one of VM servers 232-236 directly through the TUI.

A list of voicemail messages may be sent (block 1114). For example, VVM server 252 may send a list of voicemail message headers (signal 1208). In one embodiment, the voicemail headers may include message IDs, mailbox IDs, caller device numbers, and the states of the messages (e.g., information stored in a message table). In one embodiment, the voicemail headers may be sent using XML data formatting.

VVM server 252 may query aggregate message table 700 and/or header table 800-2 (e.g., header cache field 858) for the voicemail message headers (signal 1208). For example, the voicemail message headers (signal 1208) sent to mobile phone 220 from VVM server 252 may include records 754 and 760 of aggregate message table 700, as stored in header cache 858. In one embodiment, VVM server 252 may reset notification time field 856 to the current time when the voicemail message headers (signal 1208) were sent. In one embodiment, VVM server 252 may copy the appropriate data (e.g., records 754 and 760) from aggregate message table 700' (if aggregate message table 700' is working memory, for example) to header cache 858 when sending signal 1208.

In one embodiment, signal 1208 may not include the audio files themselves (e.g., MSG*.QCP), but may include the names of the audio files. In another embodiment, signal 1208 may include the audio files themselves. In one embodiment, the voicemail message headers (signal 1208) sent to mobile phone 220 may include only the records from the aggregate message table (in VVM server 252) that have new or changed information. The voicemail message headers (signal 1208) may include headers only to those voicemail mailboxes for which the user device is configured to receive. For example, mobile phone 220 may be configured to receive message headers for mailboxes MBA1, MBB1, and MBC1 as configured and stored in SWD 238.

Signal 1202 may be considered a "data pull" from the user device as opposed to a "push" from VVM server 252 to the user device. In one embodiment, the connection request (signal 1202) and/or response (signal 1208) may be included as part of HTTP signaling. In this embodiment, signals 1202 and/or 1208 may be considered "heavier" than the notification (signal 1008) (e.g., when the notification (signal 1008) is an SMS). As such, signals 1202 and/or 1208 may have a higher probability of failure (compared to an SMS) due to factors such as no data service at a location, weak signal strength, or a slow connection. The device (e.g., a VVM application running in mobile phone 220) may repeatedly try to establish the connection to receive the header information (signal 1208) before indicating to the user to use the TUI (e.g., using the voice channel). If, on the other hand, data service is available, there is sufficient signal strength, and/or the connection is fast enough, then the user device may receive the header information (signal 1208) in the background.

Figure 11B:
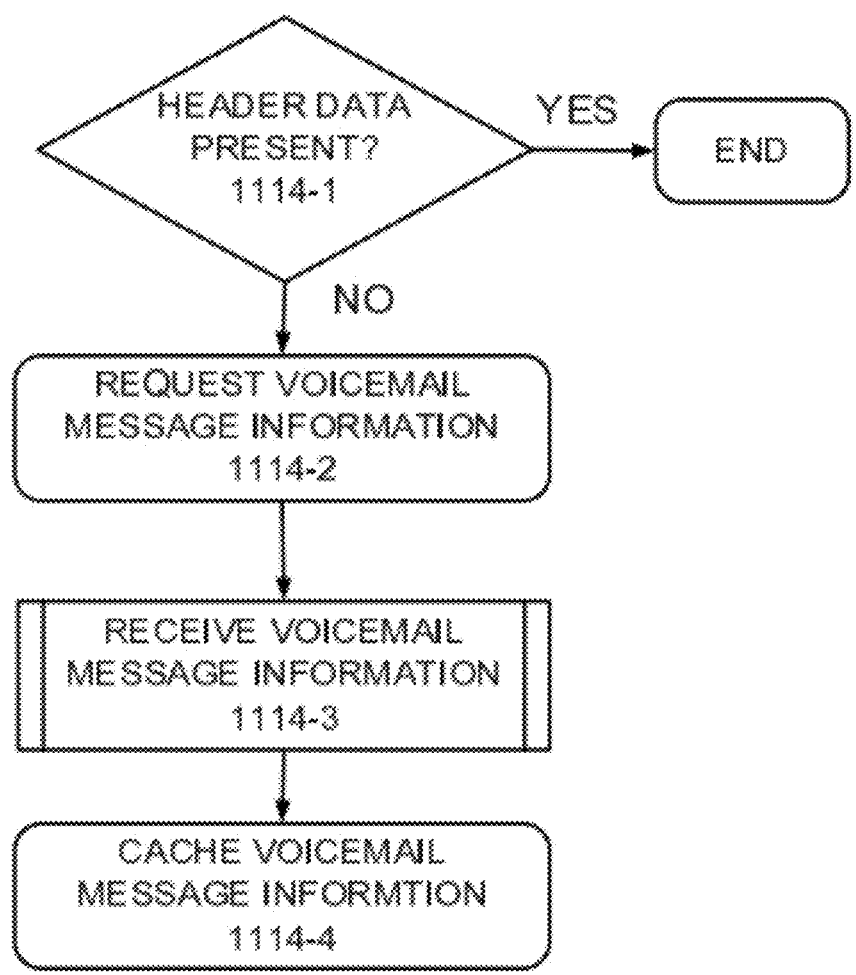
FIG. 11B is a flowchart of a process for receiving voicemail message information.

If aggregate message table 700' or header table 800-2 does not include any data, then VVM server 252 may reconstitute the data using process 1100B discussed below with respect to FIG. 11B. This may occur, for example, if a user device requests voicemail headers well after header cache field 858 expires, e.g., a header request independent of a new voicemail notification message.

The voicemail message list may be synchronized (block 1116). Mobile phone 220 may compare the voicemail message headers received in signal 1208 with voicemail message information stored in mobile phone 220 and may update its message table. For example, mobile phone 220 may update its aggregate message table from the condition shown in message table 700 to that shown in aggregate message table 700'. If mobile phone 220 does not include a message table with any information, then mobile phone 220 may create a message table corresponding to aggregate message table 700'.

As a further example, if the voicemail message list (signal 1208) indicates that a particular message (identified by a message ID, for example) has been deleted and mobile phone 220 does not previously know this information, then mobile phone 220 may indicate (by updating message table) that the corresponding voicemail message has been deleted. If the voicemail message list (signal 1208) indicates that a particular message (identified by a message ID, for example) has been heard and mobile phone 220 believed it to have been new, then mobile phone 220 may update its message table to indicate that the voicemail message has been heard.

Voicemail message audio files may be requested (block 1118). For example, mobile phone 220 may determine that the voicemail message list received indicates that a new voicemail audio file exists (e.g., MSG9.QCP corresponding to record 762). Mobile phone 220 may not have the corresponding audio file, e.g., mobile phone 220 may only have the header information. In this situation, mobile phone 220 may send a request message (signal 1212) for the audio file to VVM server 252. The request message (signal 1212) may include the device number (e.g., of mobile phone 220), the session cookie from the earlier authentication, and the mailbox and message IDs for the requested voicemail audio file. In one embodiment, the request message (signal 1212) may include the file format that the user device supports, such as MP3, WMA, AAC, QCP, QCEP, EVRC, AMR, Ogg Vorbis, etc.

Mobile phone 220 may also determine that the received voicemail message list (signal 1208) indicates that no new voicemail audio files exist. For example, the voicemail message list may indicate that the status of a voicemail has changed from NEW to HEARD, or HEARD to DELETED. In this case, mobile phone 220 may avoid requesting any new audio files.

VVM server 252 may receive the request (signal 1212) and may send a request (signal 1214) for the audio files to the appropriate one of VM servers 232-236 (block 1120). The request to wireless VM server 236 (signal 1214) may include, for example, the device number (e.g., of mobile phone 220), the PIN stored in device proxy 254 and/or VVM server 252 after authentication, the message ID, the location, the requested file format (e.g., QCP), and the mailbox ID. In one embodiment, the user device requesting an audio file may be a different device than the user device associated with the mailbox ID. For example, mobile phone 220 (associated with wireless VM server 236) may request an audio file from home VM server 234 or work VM server 232, as well as wireless VM server 236. In some implementations, VVM server 252 may receive the request (signal 1212) according to load balancing process 900C.

Voicemail audio file(s) may be received (block 1121) and forwarded or sent to the requesting user device (block 1122). For example, VVM server 252 may receive the voicemail audio files (signal 1216). VVM server 252 may receive the voicemail audio files (signal 1216) according to load balancing process 900C. VVM server 252 may forward the audio files (signal 1218) to mobile phone 220 (block 1122). One embodiment, mobile phone 220 may send multiple audio file request messages (e.g., signal 1212) for each new voicemail message mobile phone 220 decides to download. In this embodiment, VVM server 252 may send multiple request messages (e.g., signal 1214) to wireless VM server 236, wireless VM server 236 may respond with multiple messages (e.g., signal 1216), and VVM server 252 may send multiple audio files (e.g., signal 1218) to mobile phone 220. In another embodiment, the audio file request message (signal 1212) may include multiple mailbox and/or message IDs to identify multiple audio files, e.g., an audio file associated with each message ID. In one embodiment, mobile phone 220 may prompt the user of the device before sending an audio file request signal (signal 1212) because the user may not want to spend the time and/or bandwidth, for example, to download multiple audio files.

The transmission of one or more voicemail audio files may be interrupted (block 1124). The user may interrupt the downloading of audio files by interrupting the VVM device application, for example. In this situation (block 1124: YES), the downloading of voicemail messages may be stopped (block 1125) and a new voicemail notification message may display on the user device, e.g., mobile phone 220 (block 1126). The audio files (signal 1218) and the request (signal 1212) may be included in HTTP signaling, for example. Signals 1218 and/or 1212 may be considered "heavier" than the connection request (signal 1202) because signals 1212 likely include more data. As such, signals 1218 and/or 1212 may have a higher probability of failure (compared to signals 1202 and 1208) due to factors such as no data service at a location, weak signal strength, or a slow connection. The device (e.g., a VVM application running in mobile phone 220) may repeatedly try to establish the connection to receive the audio files (signal 1218) before indicating to the user to use the TUI (e.g., using the voice channel). If, on the other hand, data service is available, there is sufficient signal strength, and/or the connection is fast enough, then the user device may receive the audio files (signal 1218) in the background.

If the downloading of audio files is not interrupted (block 1124: NO), then a new voicemail notification message may be displayed (block 1126) to the user after successful download of the audio files. An exemplary new voicemail notification is shown in FIG. 1B, discussed above.

The voicemail message headers may be displayed (block 1128). The voicemail message headers may include the caller number, the called number, the mailbox ID, etc. An exemplary list of voicemail headers is shown in FIG. 11C, discussed above. In one embodiment, the voicemail message headers are displayed after the user acknowledges the new voicemail message notification message in block 1126 by, for example, touching one of control keys 308 or display 306 on mobile phone 220. Voicemail messages may be displayed in order of when they were received, in order of urgency, etc.

A command to act on a voicemail message may be received (block 1130). For example, the user of mobile phone 220 may listen to a voicemail message, delete a voicemail message, save a voicemail message, etc. The GUI shown in FIG. 11C, for example, includes options 114 and 116 for deleting and playing a voicemail message, respectively.

One or more of user device 208-220 may similarly make a determination of whether to synchronize or not (block 1102). A user device may initiate a synchronization process at any time, such as when the device is turned on, on a periodic basis, in response to a user action (e.g., selection of an option on the user device), etc.

As discussed above, if aggregate message table 700' or header table 800-2 does not include any data, then VVM server 252 may reconstitute the data. FIG. 11B is a flowchart of a process 1100B for receiving and/or reconstituting voicemail message information (e.g., headers). VVM server 252 may have to reconstitute header information when a user device requests voicemail headers well after header cache field 858 expires, e.g., a header request independent of a new voicemail notification message.

Process 1100B is described with respect to FIG. 10A. If voicemail message information is not present (block 1114-1), then voicemail message information may be requested (block 1114-2). For example, if aggregate message table 700 and/or header cache 858 does not include message information for the mailbox ID (e.g., MBC1) for the device number (e.g., for mobile phone 220), then VVM server 252 may request new header information from a VM server. VVM server 252 may send a request (e.g., signal 1004) for information regarding the voicemail messages stored by wireless VM server 236. The request (signal 1004) may include the called DN (e.g., of mobile phone 220), the mailbox ID (e.g., MBC1), and the PIN associated with the mailbox ID. The PIN may be stored in PIN field 804 of device table 800-1. If device table 800-1 does not have the PIN associated with the mailbox ID, or if the PIN was not correct, then VVM server 252 may request the PIN from mobile phone 220 according to process 900E discussed above with respect to FIG. 9E.

Information regarding voicemail messages may be received (block 1114-4). VVM server 252 may receive voicemail message information (e.g., signal 1006) from wireless VM server 236. Wireless VM server 236 may send voicemail message information (signal 1006) in response to receiving the request (signal 1004) for information regarding voicemail messages. VVM server 252 may receive the voicemail message information (signal 1006) according to a process 900C, discussed above with respect to FIG. 9C.

The voicemail message information may be cached (block 1114-4). For example, VVM server 252 may store the voicemail information in aggregate message table 700 and/or header cache field 858 in header table 800-2.

Figure 13A:
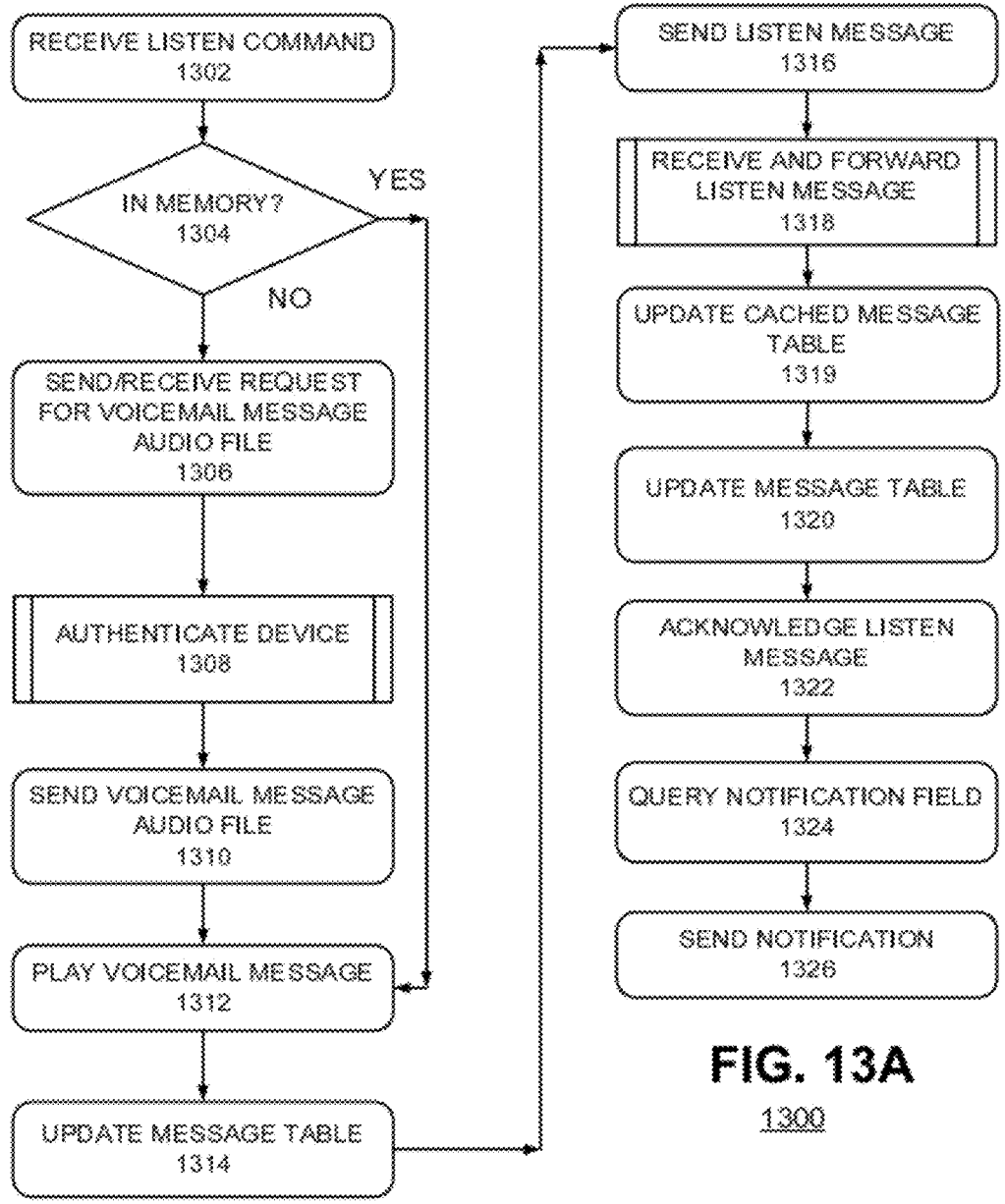
FIG. 13A is a flowchart of an exemplary process for listening to a voicemail message.

After a user device downloads voicemail message information, the user may decide to listen to a voicemail message. FIG. 13A is a flowchart of an exemplary process 1300 for listening to a voicemail message. Process 1300 is described with respect to FIG. 14, which is a diagram of exemplary network signals sent in network 200 for listening to a voicemail message. For the purposes of FIG. 14, device proxy 254, SMPP gateway 256, notification server 260, and VVM gateway 262 have been omitted for simplicity.

Process 1300 may begin when a user of a device, such as mobile phone 220, selects a message for listening to by, for example, using control keys 308, keypad 310, and/or touchscreen display 306. FIG. 1C shows a GUI for a user to input a command to listen to a message, for example. A LISTEN command may be received (block 1302). For example, a user device, such as mobile phone 220, may receive the LISTEN command from the user through the GUI shown in FIG. 1C. If the voicemail message audio file is in memory 460 of the user device (block 1304: YES), then the voicemail message may be played (block 1312). For example, mobile phone 220 may have already downloaded the voicemail message from wireless VM server 236 in block 1121.

If the voicemail message audio file is not in memory 460 of the user device (block 1304: NO), then the user device may request the audio file corresponding to the voicemail message. For example, mobile phone 220 may not have the corresponding audio file in memory 460 if the user interrupted the audio file download (FIG. 11A, block 1124: YES) or if the user opted not to download the audio files. In this case, in one embodiment, mobile phone 220 may send an audio file request message, similar to signal 1212 of FIG. 12, to download the corresponding audio file (block 1306).

The user device may be authenticated (block 1308). For example, VVM server 252 may authenticate mobile phone 220 using, for example, a session cookie sent in the audio file request (similar to signal 1212). If VVM server 252 does not recognize the cookie, then VVM server 252 may authenticate the device according to process 1300B described below with respect to FIG. 13B.

The audio file may be sent (block 1310). For example, VVM server 252 may send a request (similar to signal 1214) to wireless VM server 236 and may receive the audio file (similar to signal 1216). VVM server 252 and may send the audio file (similar to signal 1218) to mobile phone 220 for playback to the user (block 1312). In one embodiment, the audio file may be streamed (e.g., listened to in real time) from wireless VM server 236 to mobile phone 220 for playing to the user (block 1312).

The message table in the user device may be updated (block 1314), e.g., the state of the listened-to voicemail message may be changed. For example, the state of the voicemail message may be changed from NEW to HEARD or SAVE (e.g., in message table 464). A LISTEN message (e.g., a state change message) may be sent to a VM server (block 1316). For example, after playing the voicemail message, mobile phone 220 may send a LISTEN message (signal 1402) to VVM server 252. The LISTEN message (signal 1402) may include the device number (e.g., of mobile phone 220), the session cookie (for authentication), and the mailbox and message IDs corresponding to the listened-to message.

The LISTEN message may be received and forwarded (block 1318). For example, VVM server 252 may receive the message (signal 1402). If VVM server 252 does not recognize the cookie, then VVM server 252 may authenticate the device according to process 1300B described below with respect to FIG. 13B. VVM server 252 may update aggregate message table 700 and/or header cache field 858 to reflect the LISTEN message received.

VVM server 252 may forward the message (signal 1404) to VM server 236. The LISTEN message (signal 1404) sent to wireless VM server 236 may include the device number (e.g., of mobile phone 220), the message and mailbox IDs of the listened-to message, and the PIN corresponding to the mailbox ID. The PIN may be stored in PIN field 804 of device table 800-1. In one embodiment, if device table 800-1 does not have the PIN associated with the mailbox ID, or if the PIN was not correct, then VVM server 252 may request the PIN from the device according to process 900E, described above.

In one embodiment, the user device sending the LISTEN message may be a different device than the user device associated with the mailbox ID. For example, mobile phone 220 (associated with wireless VM server 236) may send a LISTEN message to home VM server 234 or work VM server 232, as well as wireless VM server 236.

The VM server may update the message table (block 1320) corresponding to the message ID. For example, wireless VM server 236 may update message table 600-3 to change the state of a message from NEW to HEARD. Likewise, VVM server 252 may also update its aggregate message table, such as message table 700, to change the state of the message from NEW to HEARD (e.g., VVM server 252 may change the status of the message in record 760 associated with mailbox MBC1 to HEARD). The LISTEN message may be acknowledged (block 1322). Wireless VM server 236 may send an acknowledgment message (signal 1406) to VVM server 252, which may be received and forwarded as an acknowledgment message (signal 1408) to the user device, e.g., mobile phone 220.

A notification field may be queried (block 1324). For example, VVM server 252 may query VVM table 800 (field 811) to determine which user devices, if any, should be notified of the update to the aggregate message table that may have taken place at block 1320. One or more notifications may be sent (block 1326). For example, if VVM server 252 changed the status of a voicemail message associated with mailbox MBC1 in response to a LISTEN message from mobile phone 220 (e.g., device number 2022513434), then VVM server 252 may query VVM table 800 to determine that devices associated with device numbers 7035678989 (e.g., smart phone 216) and 2023459292 (e.g., PDA 218) may be notified of the change in state. As shown in FIG. 14, a notification message (signal 1410) may be sent to smart phone 216 and a notification message (signal 1412) may be sent to PDA 218. Signals 1410 and 1412 may include the same or similar information as the notification signal sent at block 958 of process 900F. Alternatively, the notification signals (signals 1410 and 1412) may include the mailbox ID, the message ID, and the corresponding change (e.g., indicative of the state change from NEW to HEARD). Therefore, multiple user devices may be kept up-to-date regarding information stored in the aggregate message table of VVM server 252.

In another embodiment, a user device (e.g., mobile phone 220) may update a VM server (e.g., wireless VM server 236) with state changes (e.g., a LISTEN message) at a different time, such as on a periodic basis or when the user terminates the VVM application in the user device. In one embodiment, the user device may not change the state of a message in its memory until it receives an acknowledgment from the VM server.

Figure 13B:
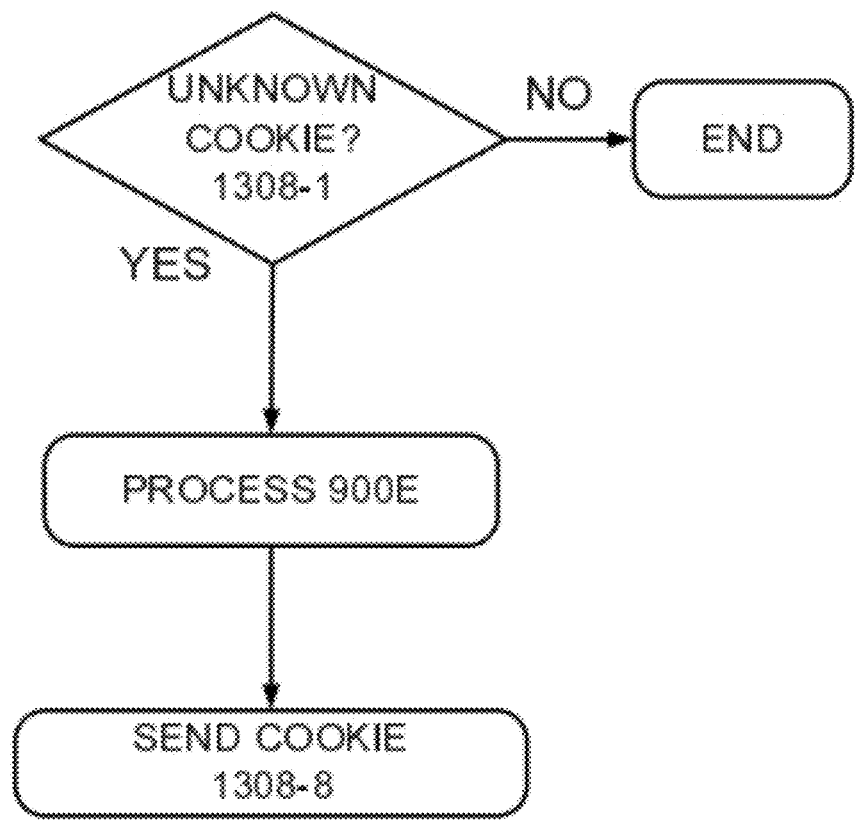
FIG. 13B is a flowchart of a process for authenticating a device when a cookie is not recognized.

FIG. 13B is a flowchart of a process 1300B for authenticating a device when a cookie is not recognized. As discussed above, if VVM server 252 does not recognize a cookie (block 1308-1), e.g., in LISTEN message 1402 or during authentication (block 1308), then VVM server 252 may authenticate the device. In this case (1308-1: YES), process 1300B may execute process 900E described above in relation to FIG. 9E. In process 900E, VVM server 252 sends an authentication request (signal 1052) to the user device, obtains the PIN in a header request (signal 1054), and confirms the PIN in a PIN validation query (signal 1056) with the VM server. After validation confirmation (block 906-7), a cookie may be sent (block 1308) to the user device. In addition, VVM server 252 may store the PIN in VVM table 800, field 804 for future requests from the user device.

After a user device downloads voicemail message information, the user may perform various operations on a voicemail message, such as deleting or saving a voicemail message, that may change message tables in network 200. For example, a user may enter a command into a user device to change the state of a message from "SAVE" to "NEW." In this case, the user device may update its message table to change the state of a message from "SAVE" to "NEW." As another example, a user may enter a command into a user device to delete a message. In this case, the user device may update its message table to change the state of a message from "HEARD" to "DELETE." As yet another example, a user may enter a command into a user device to save a message. In this case, the user device may update its message table to change the state of a message from "HEARD" to "SAVE." In this case, the user device may update VVM server 252 with a signal similar to LISTEN signal 1402 and process 1300A.

As discussed above, in one embodiment, application layer 206 may include a memory-less or state-less layer. Any data or states stored in application layer 206, if lost, may be received from other layers and/or re-determined. In this embodiment, application layer 206 may act as a pass-through for device layer 202 and VM layer 204. This embodiment may increase reliability. Application layer 206, however, may store data and/or states for redundancy and to improve performance. For example, if application layer 206 looses device information (e.g., a PIN, device number, cookie, mailbox ID, name, etc.) it may receive this data from a user device (and/or a VM server). If application layer 206 loses voicemail message information (e.g., header information, audio files), it may receive this data from one of the VM servers (and/or a device).

In one embodiment, methods and systems described above may allow for the management of email as well as voicemail.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system, comprising:
a load balancer including a receiver configured to receive a first notification of voicemail message information associated with a voicemail mailbox;
a plurality of servers, each of the plurality of servers including:
a receiver configured to receive the first notification of the voicemail message information from the load balancer, and
a transmitter configured to send a second notification of the voicemail message information to a communication device associated with the voicemail mailbox, wherein the second notification causes the communication device to determine whether to request a list of voicemail messages; and
wherein the load balancer includes a processor configured to select a first one of the plurality of servers and a transmitter to send the first notification to the first one of the plurality of servers.

2. The system of claim 1,
wherein the receiver in the load balancer is configured to receive, from the communication device in response to the second notification, a request for the list of voicemail messages associated with voicemail mailbox;
wherein the processor in the load balancer is configured to select a second one of the plurality of servers, wherein the second one is different than the first one of the plurality of servers; and
wherein the second one of the plurality of servers sends, to the communication device, the list of voicemail messages associated with the voicemail mailbox.

3. The system of claim 2, further comprising:
one or more memories including a database to store voicemail message information associated with the voicemail mailbox, wherein the one or more memories are shared among the plurality of servers,
wherein the second one of the plurality of servers is further configured to:
determine whether the one or more memories include the list of voicemail messages associated with the voicemail mailbox;
retrieve the list of voicemail messages associated with the voicemail mailbox from the one or more memories when the one or more memories includes the list of voicemail messages associated with the voicemail mailbox; and
request the list of voicemail messages from a voicemail server when the one or more memories does not include the list of voicemail messages associated with the voicemail mailbox, wherein the voicemail server stores the voicemail message information.

4. The system of claim 3, wherein the request for the list of voicemail messages associated with the voicemail mailbox includes information for the second one of the plurality of servers to identify the voicemail mailbox and authenticate the communication device to the voicemail server.

5. The system of claim 4, wherein the information for the second one of the plurality of servers includes an identifier that identifies the voicemail mailbox, an identifier that identifies the communication device, and a password or a cookie to authenticate the communication device to the second one of the plurality of servers.

6. The system of claim 1, wherein the processor in the load balancer is further configured to select the one of the plurality of servers in a round-robin fashion, in a, random fashion, or based on a, processing load of one or more of the plurality of servers.

7. The system of claim 1, wherein the first notification of voicemail message information includes information to identify the voicemail mailbox and the communication device associated with the voicemail mailbox.

8. The system of claim 7, wherein the information to identify the voicemail mailbox and the communication device includes a mailbox identifier and a device number.

9. A system comprising:
a plurality of servers including:
a receiver configured to receive a first notification of voicemail message information associated with a, voicemail mailbox from a voicemail server, wherein the voicemail server stores the voicemail message information and wherein the first notification includes information to identify the voicemail mailbox and a communication device associated with the voicemail mailbox,
one or more memories including a database to store voicemail message information associated with the voicemail mailbox, wherein the one or more memories are shared among the plurality of servers, and
a transmitter configured to send a second notification of the voicemail message information to a communication device associated with the voicemail mailbox, wherein the second notification causes the communication device to determine whether to request a list of voicemail messages,
wherein the receiver is further configured to receive, from the communication device in response to the second notification, a request for a list of voicemail messages associated with voicemail mailbox, wherein the requests includes information for the one or more servers to identify the voicemail mailbox and authenticate the communication device to the voicemail server; and
a load balancer including a receiver configured to receive the first notification of voicemail message information associated with the voicemail mailbox, wherein the load balancer includes a processor configured to select a first one of the plurality of servers and a transmitter to forward the first notification to the first one of the plurality of servers.

10. The system of claim 9, wherein the information in the first notification, to identify the voicemail mailbox and the communication device associated with the voicemail mailbox includes a mailbox identifier and a device number.

11. The system of claim 9, wherein the one or more servers retrieve the list of voicemail messages associated with the voicemail mailbox from the one or more memories and, if the one or more memories do not include the list of voicemail messages, the one or more servers requests the list of voicemail messages from the voicemail server.

12. The system of claim 11, wherein the information, in the request for the list of voicemail messages, for the one or more servers to identify the voicemail mailbox and authenticate the communication device to the voicemail server includes a voicemail mailbox identifier, a device number, and a password or a cookie.

13. The system of claim 9,
wherein the receiver in the load balancer is configured to receive, from the communication device, the request for the list of voicemail message associated with voicemail mailbox,
wherein the processor in the load balancer is configured to select a second one of the plurality of servers, wherein the second one is different than the first one of the plurality of servers; and
wherein the second one of the plurality of servers sends, to the communication device, the list of voicemail messages associated with the voicemail mailbox.

14. The system of claim 13, wherein the processor of the load balancer selects the one of the plurality of servers in a round-robin fashion, in a random fashion, or based on a processing load of one or more of the plurality of servers.

15. A method comprising:
receiving, in a load balancer, a first notification of voicemail message information associated with a voicemail mailbox;
selecting a first one of a plurality of servers to send the first notification;
transmitting the first notification to the first one of the plurality of servers;
receiving, in the first one of the plurality of servers, the first notification of the voicemail message information from the load balancer, and
transmitting a second notification of the voicemail message information to a communication device associated with the voicemail mailbox, wherein the second notification causes the communication device to determine whether to request a list of voicemail messages.

16. The method of claim 15, further comprising:
receiving, in the load balancer from the communication device, a request for a list of voicemail messages associated with voicemail mailbox in response to the second notification;
selecting a second one of the plurality of servers, wherein the second one is different than the first one of the plurality of servers; and
sending to the communication device, from the second one of the plurality of servers sends, the list of voicemail messages associated with the voicemail mailbox.

17. The method of claim 16,
retrieving the list of voicemail messages associated with the voicemail mailbox from one or more memories, wherein the one or more memories include a database to store voicemail message information associated with the voicemail mailbox and wherein the one or more memories are shared among the plurality of servers; and
requesting the list of voicemail messages from a voicemail server when the one or more memories do not include the list of voicemail messages, wherein the voicemail server stores the voicemail message information and audio files associated with the voicemail message information.

18. The method of claim 17, wherein the request for the list of voicemail messages associated with the voicemail mailbox includes information for the second one of the plurality of servers to identify the voicemail mailbox and authenticate the communication device to the voicemail server.

19. The method of claim 18, wherein the information for the second one of the plurality of servers includes an identifier that identifies the voicemail mailbox, an identifier that identifies the communication device, and a password or a cookie.

20. The method of claim 15, wherein selecting the first one of the plurality of servers includes selecting in a round-robin fashion, in a random fashion, or based on a processing load of one or more of the plurality of servers.

21. The method of claim 15, wherein the first notification of voicemail message information includes information to identify the voicemail mailbox and the communication device associated with the voicemail mailbox.

22. The method of claim 21, wherein the information to identify the voicemail mailbox and the communication device includes a mailbox identifier and a device number.

* * * * *